United States Patent
Breed et al.

(10) Patent No.: US 6,422,595 B1
(45) Date of Patent: *Jul. 23, 2002

(54) OCCUPANT POSITION SENSOR AND METHOD AND ARRANGEMENT FOR CONTROLLING A VEHICULAR COMPONENT BASED ON AN OCCUPANT'S POSITION

(75) Inventors: David S. Breed, Boonton Township, Morris County, NJ (US); Wendell Johnson, San Diego, CA (US); Wilbur E. Duvall, Kimberling City, MO (US)

(73) Assignee: Automotive Technologies International, Inc., Denville, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/639,299

(22) Filed: Aug. 15, 2000

Related U.S. Application Data

(63) Continuation-in-part of application No. 09/448,338, filed on Nov. 23, 1999, which is a continuation-in-part of application No. 09/448,337, filed on Nov. 23, 1999, which is a continuation-in-part of application No. 09/409,625, filed on Oct. 1, 1999, which is a continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned.

(51) Int. Cl.$^7$ .......................... B60R 21/32; B60K 28/00
(52) U.S. Cl. .......................... 280/735; 180/272; 701/45
(58) Field of Search .................. 280/735; 180/272; 701/45

(56) References Cited

U.S. PATENT DOCUMENTS

| | | | |
|---|---|---|---|
| 3,275,975 A | 9/1966 | King | 340/1 |
| 3,974,350 A | 8/1976 | Breed | 200/61 |

(List continued on next page.)

FOREIGN PATENT DOCUMENTS

| | | | |
|---|---|---|---|
| DE | 3737554 | 5/1989 | |
| DE | 3802159 | 8/1989 | 280/735 |

(List continued on next page.)

OTHER PUBLICATIONS

"Trends in Sensing Frontal Impacts", D. Breed et al., SAE Paper No. 890750, Feb., 1989.

(List continued on next page.)

*Primary Examiner*—Paul N. Dickson
*Assistant Examiner*—Joselynn Y Sliteris
(74) *Attorney, Agent, or Firm*—Brian Roffe

(57) ABSTRACT

Arrangement and method in a vehicle for identifying an occupying item in which information or data about the occupying item is obtained and a pattern recognition system analyzes this information or data with respect to size, position., shape and/or motion to determine what the occupying item is whereby a distinction can be made as to whether the occupying item is human or an inanimate object. The information or data may be obtained by one or more receiver arrays which converts electromagnetic radiation into electrical signals such that the information or data about the occupying item is in the form of one or more electrical signals representative of an image of the occupying item. The same information or data may be used in arrangements and methods for controlling a vehicular component which also include a pattern recognition system for receiving and analyzing the information or data and a control unit for controlling the vehicular component based on the analysis of the information or data about the occupying item with respect to the size, position, shape and/or motion by the pattern recognition system.

42 Claims, 8 Drawing Sheets

U.S. PATENT DOCUMENTS

| | | | |
|---|---|---|---|
| 4,198,864 A | 4/1980 | Breed | 73/492 |
| 4,284,863 A | 8/1981 | Breed | 200/61.53 |
| 4,329,549 A | 5/1982 | Breed | 200/61.45 M |
| 4,573,706 A | 3/1986 | Breed | 280/734 |
| 4,683,373 A | 7/1987 | Tupman | 180/272 |
| 4,900,880 A | 2/1990 | Breed | 200/61.45 M |
| 4,933,515 A | 6/1990 | Behr et al. | 200/61.45 M |
| 4,984,651 A | 1/1991 | Grosch et al. | 180/268 |
| 4,995,639 A | 2/1991 | Breed | 280/735 |
| 5,071,160 A | 12/1991 | White | 280/735 |
| 5,074,583 A | 12/1991 | Fujita | 280/735 |
| 5,118,134 A | 6/1992 | Mattes | 280/735 |
| 5,161,820 A | 11/1992 | Vollmer | 280/730 |
| 5,184,845 A | 2/1993 | Omura | 280/735 |
| 5,202,831 A | 4/1993 | Blackburn | 364/424.05 |
| 5,232,243 A | 8/1993 | Blackburn et al. | 280/732 |
| 5,330,226 A | 7/1994 | Gentry et al. | 280/735 |
| 5,366,241 A | 11/1994 | Kithil | 280/735 |
| 5,398,185 A | 3/1995 | Omura | 364/424.05 |
| 5,413,378 A | 5/1995 | Steffens, Jr. et al. | 280/735 |
| 5,439,249 A | 8/1995 | Steffens, Jr. et al. | 280/735 |
| 5,446,661 A | 8/1995 | Gioutsos et al. | 364/424.05 |
| 5,454,591 A | 10/1995 | Mazur et al. | 280/735 |
| 5,474,327 A | 12/1995 | Schousek | 280/735 |
| 5,528,698 A | 6/1996 | Kamei et al. | 382/100 |
| 5,540,461 A | 7/1996 | Nitschke et al. | 280/735 |
| 5,573,269 A | 11/1996 | Gentry et al. | 280/735 |
| 5,602,734 A | 2/1997 | Kithil | 364/424.055 |
| 5,624,132 A | 4/1997 | Blackburn et al. | 280/735 |
| 5,636,864 A | 6/1997 | Hori | 280/735 |
| 5,653,462 A * | 8/1997 | Breed et al. | |
| 5,670,853 A | 9/1997 | Bauer | 318/286 |
| 5,683,103 A | 11/1997 | Blackburn et al. | 280/735 |
| 5,722,686 A | 3/1998 | Blackburn et al. | 280/735 |
| 5,732,375 A | 3/1998 | Cashler | 701/45 |
| 5,748,473 A | 5/1998 | Breed et al. | 364/424.055 |
| 5,770,997 A | 6/1998 | Kleinberg et al. | 340/438 |
| 5,782,485 A | 7/1998 | Takeda et al. | 280/735 |
| 5,785,347 A | 7/1998 | Adolph et al. | 280/735 |
| 5,802,479 A | 9/1998 | Kithil et al. | 701/45 |
| 5,829,782 A | 11/1998 | Breed et al. | 280/735 |
| 5,848,802 A | 12/1998 | Breed et al. | 280/735 |
| 5,900,677 A | 5/1999 | Musiol et al. | 307/10.1 |
| 5,901,978 A | 5/1999 | Breed et al. | 280/735 |
| 5,906,393 A | 5/1999 | Mazur et al. | 280/735 |
| 5,943,295 A | 8/1999 | Varga et al. | 367/99 |
| 5,947,514 A | 9/1999 | Keller et al. | 280/742 |
| 5,948,031 A | 9/1999 | Jinno et al. | 701/45 |
| 5,964,478 A | 10/1999 | Stanley et al. | 280/735 |
| 5,964,815 A | 10/1999 | Wallace et al. | 701/45 |
| 5,967,549 A | 10/1999 | Allen et al. | 280/735 |
| 6,007,095 A | 12/1999 | Stanley | 280/735 |
| 6,010,151 A | 1/2000 | Honda | 280/733 |
| 6,014,602 A | 1/2000 | Kithil et al. | 701/45 |
| 6,018,693 A | 1/2000 | Blackburn et al. | 701/45 |
| 6,020,812 A | 2/2000 | Thompson et al. | 340/438 |
| 6,026,340 A | 2/2000 | Corrado et al. | 701/47 |
| 6,027,138 A | 2/2000 | Tanaka et al. | 280/735 |
| 6,029,105 A | 2/2000 | Schweizer | 701/45 |
| 6,043,736 A | 3/2000 | Sawahata et al. | 340/438 |
| 6,053,529 A | 4/2000 | Frusti et al. | 280/735 |
| 6,220,627 B1 * | 4/2001 | Stanley | |
| RE37,260 E * | 7/2001 | Varga et al. | |
| 6,255,939 B1 * | 7/2001 | Roth et al. | |

FOREIGN PATENT DOCUMENTS

| | | | |
|---|---|---|---|
| DE | 4112579 | 10/1991 | |
| DE | 4016610 | 11/1991 | |
| DE | 4023109 | 1/1992 | |
| JP | 1-197151 | 8/1989 | 180/287 |
| JP | 3-42337 | 2/1991 | 180/273 |
| JP | 3-159838 | 7/1991 | |
| WO | 94/22693 | 10/1994 | 280/735 |

OTHER PUBLICATIONS

"Critique of Single Point Sensing", D. Breed et al., SAE Paper No. 920124, Feb., 1992.

"Mechanism of Injury From Air Bag Deployment Loads", Lau et al., Accid. Anal. & Prev., vol. 25, No. 1, pp. 29–45, Feb., 1993.

* cited by examiner

OCCUPANT POSITION SENSOR AND METHOD AND ARRANGEMENT FOR CONTROLLING A VEHICULAR COMPONENT BASED ON AN OCCUPANT'S POSITION

CROSS REFERENCE TO RELATED APPLICATIONS

This application is a continuation-in-part of U.S. patent application Ser. No. 08/905,877 filed Aug. 4, 1997, now U.S. Pat. No. 6,186,537, which in turn is a continuation of U.S. patent application Ser. No. 08/505,036 filed Jul. 21, 1995, now U.S. Pat. No. 5,653,462, which in turn is a continuation of U.S. patent application Ser. No. 08/040,978 filed Mar. 31, 1993, now abandoned, which in turn is a continuation-in-part of U.S. patent application Ser. No. 07/878,571 filed May. 5, 1992, now abandoned.

This application is also a continuation-in-part application of U.S. patent application Ser. No. 09/409,625 filed Oct. 1, 1999, U.S. patent application Ser. No. 09/448,337 filed Nov. 23, 1999 and U.S. patent application Ser. No. 09/448,338 filed Nov. 23, 1999, all of which are also continuation-in-part applications of the '877 application.

FIELD OF THE INVENTION

The present invention relates to an occupant position sensor using pattern recognition techniques and methods and arrangements for controlling a vehicular component based on an occupant's position as determined utilizing pattern recognition techniques.

BACKGROUND OF THE INVENTION

Crash sensors for determining that a vehicle is in a crash of sufficient magnitude as to require the deployment of an inflatable restraint system, or airbag, are either mounted in a portion of the front of the vehicle which has crushed by the time that sensor triggering is required, the crush zone, or elsewhere such as the passenger compartment, the non-crush zone. Regardless of where sensors are mounted there will always be crashes where the sensor triggers late and the occupant has moved to a position near to the airbag deployment cover. In such cases, the occupant may be seriously injured or even killed by the deployment of the airbag. This invention is largely concerned with preventing such injuries and deaths by preventing late airbag deployments.

In a Society of Automotive Engineers (SAE) paper by Mertz, Driscoll, Lenox, Nyquist and Weber titled "Response of Animals Exposed to Deployment of Various Passenger Inflatable Restraint System Concepts for a Variety of Collision Severities and Animal Positions" SAE 826074, 1982, the authors show that an occupant can be killed or seriously injured by the airbag deployment if he or she is located out of position near or against the airbag when deployment is initiated. These conclusions were again reached in a more recent paper by Lau, Horsch, Viano and Andrzejak titled "Mechanism of Injury From Airbag Deployment Loads", published in *Accident Analysis & Prevention,* Vol. 25, No. 1, 1993, Pergamon Press, New York, where the authors conclude that "Even an inflator with inadequate gas output to protect a properly seated occupant had sufficient energy to induce severe injuries in a surrogate in contact with the inflating module." These papers highlight the importance of preventing deployment of an airbag when an occupant is out of position and in close proximity to the airbag module.

The Ball-in-Tube crush zone sensor, such as described in U.S. Pat. Nos. 4,974,350; 4,198,864; 4,284,863; 4,329,549; 4,573,706 and 4,900,880 to D. S. Breed, has achieved the widest use while other technologies, including magnetically damped sensors such as described in U.S. Pat. No. 4.933,515 to Behr et al. and crush switch sensors such as described in U.S. Pat. No. 4,995,639 to D. S. Breed. are also available. Other sensors based on spring-mass technologies are also being used in the crush zone. Crush zone mounted sensors, in order to function properly, must be located in the crush zone at the required trigger time during a crash or they can trigger late. One example of this was disclosed in a Society of Automotive Engineers (SAE) Paper by D. S. Breed and V. Castelli titled "Trends in Sensing Frontal Impacts", SAE 890750, 1989, and further in U.S. Pat. No. 4,900,880. In impacts with soft objects, the crush of a vehicle can be significantly less than for impacts with barriers, for example. In such cases, even at moderate velocity changes where an airbag might be of help in mitigating injuries, the crush zone mounted sensor might not actually be in the crush zone at the time that sensor triggering is required for timely airbag deployment, and as- a result can trigger late when the occupant is already resting against the airbag module.

One trend in the industry was the implementation of Single Point Sensors (SPS) which are typically located in the passenger compartment. In theory, these sensors use sophisticated computer algorithms to determine that a particular crash is sufficiently severe as to require the deployment of an airbag. In another SAE paper by Breed, Sanders and Castelli titled "A Critique of Single Point Sensing", SAE 920124, 1992, which is included herein by reference, the authors demonstrate that there is insufficient information in the non-crush zone of the vehicle to permit a decision to be made to deploy an airbag in time for many crashes. Thus, sensors mounted in the passenger compartment or other non-crush zone locations, will also trigger the deployment of the airbag late on many crashes.

A crash sensor is necessarily a predictive device. In order to inflate the airbag in time, the inflation must be started before the full severity of the crash has developed. All predictive devices are subject to error, so that sometimes the airbag will be inflated when it is not needed and at other times it will not be inflated when it could have prevented injury. The accuracy of any predictive device can improve significantly when a longer time is available to gather and process the data. One purpose of the occupant position sensor is to make possible this additional time in those cases where the occupant is farther from the steering wheel when the crash begins and/or where, due to seat belt use or otherwise, the occupant is moving toward the steering wheel more slowly. In these cases, the decision on whether to deploy the airbag can be deferred and a more precise determination made of whether deployment of the airbag is needed and the characteristics of such deployment.

The discussions of timely airbag deployment above are mostly based on the seating position of the average male (the so called 50% male) relative to the airbag or steering wheel. For the 50% male, the sensor triggering requirement has been typically calculated based on an allowable motion of the occupant of 5 inches before the airbag is fully inflated. Airbags typically require about 30 milliseconds of time to achieve full inflation and, therefore, the sensor must trigger inflation of the airbag 30 milliseconds before the occupant has moved forward 5 inches. The 50% male, however, is actually the 70% person and therefore about 70% of the population sit on average closer to the airbag than the 50% male and thus are exposed to a greater risk of interacting with the deploying airbag. One informal survey, for example, found that although the average male driver sits about 12 inches from the steering wheel, about 2% of the population of drivers sit closer than 6 inches from the steering wheel and 10% sit closer than 9 inches. Also, about 1% of drivers sit at about 24 inches and about 16% at least 18 inches from the steering wheel. The sensor or airbag systems on the market in 1992 did not take account of this variation in occupant seating position and yet this can have a critical effect on the sensor required maximum triggering time.

For example, if a fully inflated airbag is about 7 inches thick, measured from front to back, then any driver who is seated closer than 7 inches will necessarily interact with the deploying airbag and the airbag probably should not be deployed at all. For one analyzed 30 mph barrier crash of a mid-sized car, the sensor required triggering time, in order to allow the airbag to inflate fully before the driver becomes closer than 7 inches from the steering heel, results in a maximum sensing time of 8 milliseconds for an occupant initially positioned 9 inches from the airbag, 25 milliseconds at 12 inches, 45 milliseconds at 18 inches and 57 milliseconds for the occupant who is initially positioned at 24 inches from the airbag. Thus for the same crash, the sensor required triggering time varies from a no trigger to 57 milliseconds, depending on the initial position of the occupant. A single sensor triggering time criterion that fails to take this into account, therefore, will cause injuries to small people or deny the protection of the airbag to larger people. A very significant improvement to the performance of an airbag system will necessarily result from taking the occupant position into account as described herein.

A further complication results from the fact that a greater number of occupants are now wearing seatbelts which tends to prevent many of these occupants from getting too close to the airbag. Thus, just knowing the initial position of the occupant is insufficient and either the position must be continuously monitored or the seatbelt use must be known. Also, the occupant may have fallen asleep or be unconscious prior to the crash and be resting against the steering wheel. Some sensor systems have been proposed that double integrate the acceleration pulse in the passenger compartment and determine the displacement of the occupant based on the calculated displacement of an unrestrained occupant seated at the mid seating position. This sensor system then prevents the deployment of the airbag if, by this calculation, the occupant is too close to the airbag. This calculation can be greatly in error for the different seating positions discussed above and also for the seatbelted occupant, and thus an occupant who wears a seatbelt could be denied the added protection of the airbag in a severe crash.

As the number of vehicles which are equipped with airbags is now rapidly increasing, the incidence of late deployments is also increasing. It has been estimated that out of approximately 400 airbag related complaints to the National Highway Traffic Safety Administration (NHSA) through 1991, for example, about 5% to 10% involved burns and injuries which were due to late airbag deployments. There are also now many known fatalities where a late airbag deployment is suspected as the cause.

The need for an occupant position sensor has been observed by others and several methods have been disclosed in U.S. patents for determining the position and velocity of an occupant of a motor vehicle. Each of these systems, however, has significant limitations. In White et al., U.S. Pat. No. 5,071,160, for example, a single acoustic sensor and detector is disclosed and illustrated mounted lower than the steering wheel. White et al. correctly perceive that such a sensor could be defeated, and the airbag falsely deployed, by an occupant adjusting the control knobs on the radio and thus they suggest the use of a plurality of such transmitter/receivers. If a driver of a vehicle is seated one foot from the transmitter/receiver, and using 1128 feet per second as the velocity of sound, it would require approximately 2 milliseconds for the sound to travel to the occupant and return. The use of the same device to both transmit and detect the sound waves requires that the device cannot send and receive simultaneously and therefore it requires at least 2 milliseconds to obtain a single observation of the occupant's position. Naturally, as the distance from the occupant to the sensor increases, the observation rate further decreases. For a passenger sitting two feet from the sensor, the delay is approximately 4 milliseconds. Sensors of this type can be used to accurately obtain the initial position of the occupant but the determination of the occupant's velocity, and thus the prediction of when he/she is likely to be too close to the deploying airbag, will necessarily be inaccurate due to the long delay between position points and thus the small number of such points available for the prediction and the inherent noise in the reflected signal.

Also, ultrasonic transducers send out a pulse that typically is about 0.2 milliseconds long but, due to transducer ringing, this pulse can extend to one millisecond. Furthermore, reflections continue to return to the transducer for up to 6 to 10 milliseconds. Thus, updates from a single ranging transducer can only take place every 6 to 10 milliseconds.

Mattes et al., in U.S. Pat. No. 5,118,134, disclose a single ultrasonic transmitter and a separate receiver, but, no description is provided as to the manner in which this combination is used. In conventional ultrasonic distance measuring systems, the transmitter emits a burst of ultrasonic waves and then measures the time required for the waves to bounce off the object and reach the receptor. The transmitter does not transmit again until the waves have been received by the receiver. This system again suffers from the time delay of at least 6 to 10 milliseconds described above.

Doppler techniques can be used to determine the velocity of the occupant as disclosed below. Both White et al. and Mattes et al., however, specifically state that the occupant's velocity is determined from a succession of position measurements. The use of the Doppler effect is described in U.S. Pat. No. 3,275,975 to King, but only to determine that the occupant is not moving. No attempt is made by King to measure the velocity of the occupant toward an airbag using this effect. Also none of the references above disclose the use of an ultrasonic transmitter and receiver to simultaneously determine the position and velocity of the occupant using a combination of the transmission time and the Doppler effect as disclosed below.

The object of an occupant position sensor is to determine the location of the head and/or chest of the vehicle occupant relative to the airbag since it is the impact of either the head or chest with the deploying airbag which can result in serious injuries. For the purposes herein, therefore, whenever the position of the occupant is referenced it will mean the position of the head or chest of the occupant and not that of his/her arms, hands or legs. The preferred mounting locations of the transducers, therefore, are those locations which have the clearest unimpeded view of the occupant's head and chest. These locations are generally at the top of the dashboard, the windshield, the headliner and the rear view mirror. Both White et al. and Mattes et al. disclose only lower mounting locations of the ultrasonic transmitters such as on the dashboard or below the steeling wheel. Both such mounting locations are particularly prone to detection errors due to positioning of the occupant's hands, arms and legs. This would require at least three, and preferably more, such sensors and detectors and an appropriate logic circuitry for the case where the driver's arms are the closest objects to two of the sensors. When an unimpeded view is not possible, some means of pattern recognition, which is not disclosed in the above references, is required to differentiate between the occupant and his/her extremities such as his/her hands, arms or legs.

Mattes et al. further describe the placement of the sensor in the headrest but such an arrangement is insufficient since it measures the distance from the headrest to the occupant and not from the airbag.

White et al. further describes the use of error correction circuitry to differentiate between the velocity of one of the occupant's hands as in the case where he/she is adjusting the knob on the radio and the remainder of the occupant. Three ultrasonic sensors of the type disclosed by White et al. would accomplish this differentiation if two of them indicated that the occupant was not moving while the third was indicating that he or she was. Such a combination, however, would not differentiate between an occupant with both hands and arms in the path of the ultrasonic transmitter at such a location that it was blocking a substantial view of the occupant's head or chest. Since the sizes and driving positions of occupants are extremely varied, pattern recognition systems are required when a clear view of the occupant, unimpeded by his/her extremities, newspapers. etc., cannot be guaranteed.

As noted above, occupant sensors could assure that the safe proximity to the airbag is maintained. Most such sensors deactivate the airbag if an occupant is in a danger zone. There are several types of occupant sensors that have been proposed and/or are in use (although not necessarily prior to the effective date of the subject matter of most if not all of the claimed inventions), some of which are discussed above. Infrared occupant detection observes the distance where the emitted infrared beams are broken and can determine proximity to the airbag of the occupant from this data. Ultrasonic sensors use sonar-like technology to record echoes and compare them to the sound pattern of the car's interior. This information can be used to deactivate the airbag if a person is too close to the airbag. Capacitive reflective occupant sensing computes distance by detecting dielectric constant of water within the operating range of the sensor, and can distinguish a human from an inanimate object in the seat. Another capacitive sensor uses a comparison to the dielectric constant of air. A human who is 80 times more conductive than air will register as being in a seat and the distance recognized. Objects not so conductive will not register. A non-register is interpreted as an unoccupied seat. This unoccupied seat message could be used to prevent the airbag from deploying. Force sensing resistors located in the seats can also be used to detect the presence of an occupant. Occupant sensors deactivate airbags if a seat registers as unoccupied or if the occupant is detected too close to the airbag.

The use of a capacitive sensor in a vehicle to generate an output signal indicative of the presence of an object is described in U.S. Pat. No. 6,020,812 to Thompson et al. The presence of the object effects the reflected electric field causing a change in an output signal. The sensor is mounted on the steering wheel assembly for driver position detection or on the instrument panel near the passenger air bag module for passenger position detection. Thompson et al. also describes the use of a second capacitive sensor which generates an electric field which may or may not overlap the electric field generated by the first capacitive sensor. The positioning of the second capacitive sensor determines whether its electric field overlaps. The second capacitive sensor is used to determine whether the occupant is in a normal seating position and based on this determination, affect the decision to activate a safety restraint.

A capacitive sensor may be considered an electromagnetic wave sensor.

Modified occupant sensors have been developed to detect the presence of a child seat. These are fairly simple since only positive detection is required. The fact that a child seat is manufactured under safety regulations makes a permanently mounted sensor feasible. One system has a resonator is built into the child seat and a low power signal from the car prompts a return signal from the resonator sensing the presence of the seat and automatically turning off the passenger's front airbag. One version of this technology uses a Radio Frequency Identification (RFID) tag. Another sensor uses a normally closed magnetic proximity switch to detect the presence of a child seat. A metal plate installed on the child seat is detected and the sensor deactivates the airbag. These sensors work by detecting the presence of a child (or infant) seat and deactivating the airbag on the front passenger's side.

Pattern recognition systems for the occupant as used here means any system which will differentiate between the occupant (his or her head and chest) and his extremities (hands and arms) based on relative size, position or shape. Pattern recognition systems can also be used to differentiate an occupant from a seat or a bag of groceries also based on relative size, position or shape or even on passive infrared radiation, as described below.

OBJECTS AND SUMMARY OF THE INVENTION

The occupant position sensor of this invention is adapted for installation in the passenger compartment of an automotive vehicle equipped with a passenger passive protective device (also referred to herein as an occupant restraint device) such as an inflatable airbag. When the vehicle is subjected to a crash of sufficient magnitude as to require deployment of the passive protective device (airbag), and the crash sensor system has determined that the device is to be deployed, the occupant position sensor and associated electronic circuitry determines the position of the vehicle occupant relative to the airbag and disables deployment of the airbag if the occupant is positioned so that he/she is likely to be injured by the deploying airbag. The position of the occupant could be continuously or periodically determined and stored in memory so that instead of determining the position of the occupant(s) after the sensor system determines that the airbag is to be deployed, the most recently stored position is used when the crash sensor has determined that deployment of the airbag is necessary. In other words, the determination of the position of the occupant could precede (or even occur simultaneous with) the determination that the deployment of airbag is desired. Naturally, as discussed below, the addition of an occupant position sensor onto a vehicle leads to other possibilities such as the monitoring of the driver's behavior which can be used to warn a driver if he or she is falling asleep, or to stop the vehicle if the driver loses the capacity to control the vehicle. In fact, the motion of the occupant provides valuable data to an appropriate pattern recognition system to differentiate an animate from an inanimate occupying item.

According to one embodiment of the invention, an ultrasonic generator transmits a burst of ultrasonic waves which travel to the occupant and are reflected back to a receptor, which may be the same device as the generator. The time period required for the waves to travel from the generator and return is used to determine the position of the occupant and the frequency shift of the waves can be used to determine the velocity of the occupant relative to the airbag.

In another embodiment, infrared or other electromagnetic radiation is directed toward the occupant and lenses are used to focus images of the occupant onto arrays of charge coupled devices (CCD). Outputs from the CCD arrays, are analyzed by appropriate logic circuitry, to determine the position and velocity of the occupant's head and chest.

In yet another embodiment, a beam of radiation is moved back and forth across the occupant illuminating various portions of the occupant and with appropriate algorithms the position of the occupant in the seat is accurately determined.

In a simple implementation, other information such as seat position and/or seatback position can be used with a buckle switch and/or seatbelt payout sensor to estimate the position of the occupant.

It is a principal object of this invention to provide an occupant position sensor which reliably permits, and in a timely manner, a determination to be made that he/she is out of position, or will become out of position, and likely to be injured by a deploying airbag.

It is also a principal object of this invention to provide a system which could accurately discriminate between the occupant's head or chest and other parts of the body in determining the occupant's position and velocity.

It is another object of this invention to independently prevent the deployment of the driver or passenger airbags if either occupant is out of position.

It is still another object of this invention to provide for a more complete analysis of an occupant through the use of receiver arrays, e.g., CCD's or CMOS arrays, to capture more of the occupant's image.

Another object of this invention is to provide a warning to a driver if he/she is falling asleep.

Still another object of this invention is to sense that a driver is inebriated or otherwise suffering from a reduced capacity to operate a motor vehicle and to take appropriate action.

Yet another object of this invention is to provide a simplified system for determining the approximate location of a vehicle occupant and to use this system to control the deployment of the passive restraint. This occupant position determining system can be based on the position of the vehicle seat, the position of the seat back, the state of the seatbelt buckle switch, a seatbelt payout sensor or a combination of these.

In order to achieve one or more of these objects, an arrangement in a vehicle for identifying an occupying item comprises means for obtaining information or data about the occupying item and a pattern recognition system for receiving the information or data about the occupying item and analyzing the information or data about the occupying item with respect to size, position, shape and/or motion to determine what the occupying item is whereby a distinction can be made as to whether the occupying item is human or an inanimate object. The analysis with respect to size includes analysis with respect to changes in size, the analysis with respect to shape includes analysis with respect to changes in shape and the analysis with respect to position includes analysis with respect to changes in position. The means for obtaining information or data may comprise one or more receiver arrays (CCD's or CMOS arrays) which convert light, including infrared and ultraviolet radiation, into electrical signals such that the information or data about the occupying item is in the form of one or more electrical signals representative of an image of the occupying item. If two receiver arrays are used, they could be mounted one on each side of a steering wheel of the vehicle. In the alternative, the means for obtaining information or data may comprise a single axis phase array antenna such that the information or data about the occupying item is in the form of an electrical signal representative of an image of the occupying item. A scanning radar beam and/or an array of light beams would also be preferably provided.

The arrangement could include means for obtaining information or data about the position and/or motion of the occupying item and a pattern recognition system for receiving the information or data about the position and/or motion of the occupying item and analyzing the information or data to determine what the occupying item is whereby a distinction can be made as to whether the occupying item is an occupant or an inanimate object based on its position and/or motion.

An arrangement for controlling a vehicular component, e.g., an airbag, in accordance with the invention comprises means for obtaining information or data about an occupying item of a seat, a pattern recognition system for receiving the information or data about the occupying item and analyzing the information or data with respect to size, position, shape and/or motion, and control means for controlling the vehicular component based on the analysis of the information or data with respect to the size, position, shape and/or motion by the pattern recognition system. The control means may be arranged to enable suppression of deployment of the airbag.

A method for identifying an occupying item of a vehicle comprises the steps of obtaining information or data about the occupying item, providing the information or data about the occupying item to a pattern recognition system, and determining what the occupying item is by analyzing the information or data about the occupying item with respect to size, position, shape and/or motion in the pattern recognition system whereby the pattern recognition system differentiates a human occupant from inanimate objects.

Another method for identifying an occupying item of a vehicle comprises the steps of obtaining information or data about the position and/or motion of the occupying item, providing the information or data about the position of the occupying item to a pattern recognition system, and determining what the occupying item is by analyzing the information or data about the position of the occupying item in the pattern recognition system whereby the pattern recognition system differentiates a human occupant from inanimate objects.

A method for controlling a vehicular component comprises the steps of obtaining information or data about an occupying item of a seat of the vehicle, providing the information or data about the occupying item to a pattern recognition system, analyzing the information or data about the occupying item with respect to size, position, shape and/or motion in the pattern recognition system, and controlling the vehicular component based on the analysis of the information or data about the occupying item by the pattern recognition system. If the vehicular component is an airbag, then control thereof may entail enabling suppression of deployment of the airbag.

Another method for controlling a vehicular component comprises the steps of obtaining information or data about the position of an occupying item of a seat of the vehicle, providing the information or data to a pattern recognition system, analyzing the information or data about the position of the occupying item in the pattern recognition system, and controlling the vehicular component based on the analysis of the information or data about the position of the occupying item by the pattern recognition system.

The disclosure herein also encompasses a method of disabling an airbag system for a seating position within a motor vehicle. The method comprises the steps of providing to a roof above the seating position one or more electromagnetic wave occupant sensors, detecting presence or absence of an occupant of the seating position using the one or more electromagnetic wave occupant sensors, disabling the airbag system if the seating position is unoccupied, detecting proximity of an occupant to the airbag door if the seating position is occupied and disabling the airbag system if the occupant is closer to the airbag door than a predetermined distance. The airbag deployment parameters, e.g., inflation rate and time of deployment, may be modified to adjust inflation of the airbag according to proximity of the occupant to the airbag door. The presence or absence of the occupant can be detected using pattern recognition techniques to process the waves received by the one or more electromagnetic wave-occupant sensors.

Also disclosed herein is an apparatus for disabling an airbag system for a seating position within a motor vehicle. The apparatus preferably comprises one or more electromagnetic wave occupant sensors proximate a roof above the seating position, means for detecting presence or absence of an occupant of the seating position using the electromagnetic wave occupant sensor(s), means for disabling the airbag system if the seating position is unoccupied, means for detecting proximity of an occupant to the airbag door if the seating position is occupied and means for disabling the airbag system if the occupant is closer to the airbag door than a predetermined distance. Also, means for modifying airbag deployment parameters to adjust inflation of the airbag according to proximity of the occupant to the airbag door may be provided and may constitute a sensor algorithm resident in a crash sensor and diagnostic circuitry. The means for detecting presence or absence of the occupant may comprise a processor utilizing pattern recognition techniques to process the waves received by the one or more electromagnetic wave-occupant sensors.

Also disclosed herein is a motor vehicle airbag system for inflation and deployment of an airbag in front of a passenger in a motor vehicle during a collision. The airbag system comprises an airbag, inflation means connected to the airbag for inflating the same with a gas, passenger sensor means mounted adjacent to the interior roof of the vehicle for continuously sensing the position of a passenger with respect to the passenger compartment and for generating electrical output indicative of the position of the passenger and microprocessor means electrically connected to the passenger sensor means and to the inflation means. The microprocessor means compares and performs an analysis of the electrical output from the passenger sensor means and activates the inflation means to inflate and deploy the airbag when the analysis indicates that the vehicle is involved in a collision and that deployment of the airbag would likely reduce a risk of serious injury to the passenger which would exist absent deployment of the airbag and likely would not present an increased risk of injury to the passenger resulting from deployment of the airbag. In certain embodiments, the passenger sensor means is a means particularly sensitive to the position of the head of the passenger. The microprocessor means may include memory means for storing the positions of the passenger over some interval of time. The passenger sensor means may comprise an array of passenger proximity sensor means for sensing distance from a passenger to each of the passenger proximity sensor means. In this case, the microprocessor means includes means for determining passenger position by determining each of these distances and means for triangulation analysis of the distances from the passenger to each passenger proximity sensor means to determine the position of the passenger.

Other objects and advantages of the present invention will become apparent from the following description of the preferred embodiments taken in conjunction with the accompanying drawings.

BRIEF DESCRIPTION OF THE DRAWINGS

The invention may take physical form in certain parts and arrangements of parts, preferred embodiments of which will be described in detail in this description and illustrated in the accompanying drawings which form part hereof and wherein.

DETAILED DESCRIPTION OF THE PREFERRED EMBODIMENTS

Figure 1:
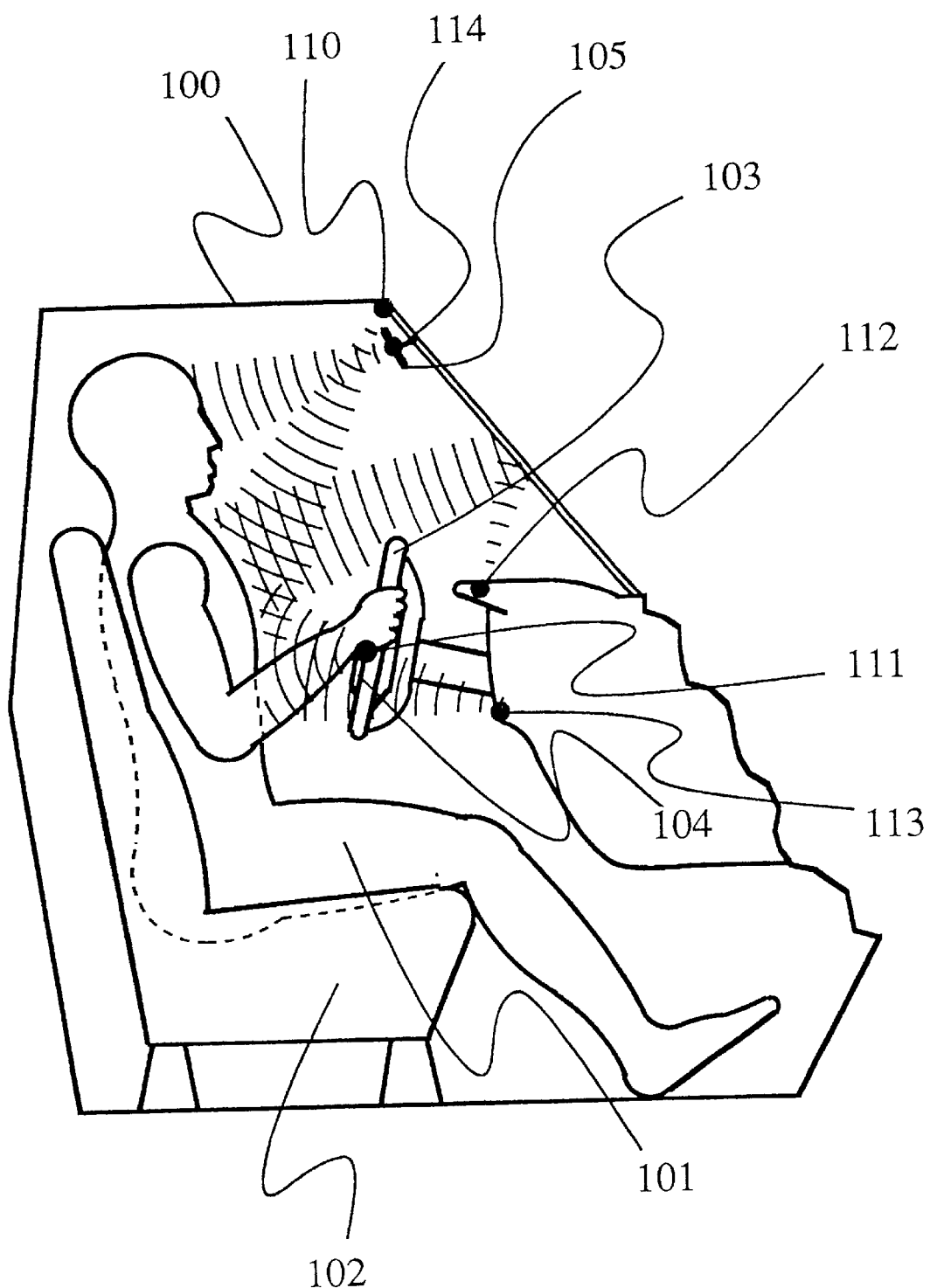
FIG. 1 is a side view, with certain portions removed or cut away, of a portion of the passenger compartment of a vehicle showing several preferred mounting locations of occupant position sensors for sensing the position of the vehicle driver.

Referring now to the drawings wherein the same reference numerals refer to the same or similar elements, a section of the passenger compartment of an automobile is shown generally as 100 in FIG. 1. A driver of a vehicle 101 sits on a seat 102 behind a steering wheel 103 which contains an airbag assembly 104. Five transmitter and/or receiver assemblies 110, 111, 112, 113 and 114 are positioned at various places in the passenger compartment to determine the position of the occupant (driver in this case) relative to the airbag, i.e., the location of one or more parts of the driver, such as the head, chest and torso of the driver, relative to the airbag. Usually, in any given implementation, three or four of the transmitters and receivers would be used depending on their mounting locations as described below.

FIG. 1 illustrates several of the possible locations of such devices. For example, transmitter and receiver 110 emits ultrasonic acoustical waves which bounce off the chest of the driver and return. Periodically, a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and thereby determines the distance from the transmitter/receiver 110 to the driver based on the velocity of sound. This information is then sent to the crash sensor and diagnostic circuitry which determines if the driver is close enough to the airbag that a deployment might, by itself, cause injury to the driver. In such a case the circuit disables the airbag system and thereby prevents its deployment. In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises to 95% for a more distant occupant. Although a driver system has been illustrated, the passenger system would be identical.

In another implementation, the sensor algorithm may determine the rate that gas is generated to affect the rate that the airbag is inflated. In all of these cases the position of the occupant is used to affect the deployment of the airbag either as to whether or not it should be deployed at all, the time or rate of deployment or as to the rate of inflation and/or deflation.

The ultrasonic transmitter/receiver 110 is similar to that used on modern auto-focus cameras such as manufactured by the Polaroid Corporation. Other camera auto-focusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared radiation can be added. In a related implementation, a source of infrared radiation is reflected off of the windshield toward the vehicle occupant. An infrared receiver 1 14 is located proximate or attached to the rear view mirror 105, as shown in FIG. 1. Alternately, the infrared radiation could be sent by the device 114 and received by a receiver elsewhere. Since any of the devices shown in FIGS. 1 and 3 could be either transmitters, receivers or both, for simplicity, only the transmitted and not the reflected wave fronts are illustrated.

In the above described system, a lens within receptor 114 captures the reflected infrared radiation from the head or chest of the driver and displays it onto a charge coupled device (CCD) or CMOS array. One type of CCD is that used in television cameras to convert an image into an electrical signal. For the purposes herein, a CCD will be considered to include all devices that are capable of converting light frequencies, including infrared and ultraviolet, into electrical signals including CMOS arrays. The CCD is scanned and the focal point of the lens is altered, under control of an appropriate circuit, until the sharpest image of the driver's head or chest results and the distance is then known from the focusing circuitry. The precision of this measurement is enhanced if two receptors are used which can either project images onto a single CCD or onto separate CCDs. In the first case, one of the lenses could be moved to bring the two images into coincidence while in the other case, the displacement of the images needed for coincidence would be determined mathematically. Naturally, other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag. In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An optical infrared transmitter and receiver assembly is shown generally at 112 in FIG. 1 and is mounted onto the instrument panel facing the windshield. Although not shown in this view, reference 112 consists of three devices, one transmitter and two receivers, one on each side of the transmitter. In this case, the windshield is used to reflect the infrared radiation, and also the radiation reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver may be determined stereoscopically through the use of the two receivers. In its most elementary sense, this system can be used to measure the distance of the driver to the airbag module. In more sophisticated applications, the position of the driver, and particularly of the drivers head, can be monitored over time and any behavior, such as a drooping head, indicative of the driver falling asleep or of being incapacitated by drugs, alcohol or illness can be detected and appropriate action taken.

Other forms of radiation including visual light, radar and microwaves as well as high frequency ultra sound could also be used by those skilled in the art.

Particular mention should be made of the use of radar since inexpensive single axis antennas are now readily available. A scanning radar beam is used in this implementation and the reflected signal is received by a single axis phase array antenna to generate an image of the occupant for input into the appropriate pattern detection circuitry, which should be considered to include, inter alia, different forms of sensor fusion. The word circuitry as used herein includes, in addition to normal electronic circuits, a microprocessor and appropriate software.

Electromagnetic or ultrasonic energy can be transmitted in three modes in determining the position of an occupant. In most of the cases disclosed above, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. This can be partially overcome through the use of the second mode which uses a narrow beam. In this case, several narrow beams are used. These beams are aimed in different directions toward the occupant from a position sufficiently away from the occupant that interference is unlikely. A single receptor could be used providing the beams are either cycled on at different times or are of different frequencies. Another approach is to use a single beam emanating from a location which has an unimpeded view of the occupant such as the windshield header or headliner. If two spaced-apart CCD array receivers are used, the angle of the reflected beam can be determined and the location of the occupant can be calculated, e.g., by triangulation. The third mode is to use a single beam in a manner so that it scans back and forth or up and down, or in some other pattern, across the occupant. In this manner, an image of the occupant can be obtained using a single receptor and pattern recognition software can be used to locate the head or chest of the occupant. The beam approach is most applicable to electromagnetic energy but high frequency ultra sound can also be formed into a narrow beam.

The windshield header as used herein includes the space above the front windshield including the first few inches of the roof. The headliner is the roof interior cover that extends back from the header.

A similar effect to modifying the wave transmission mode can also be obtained by varying the characteristics of the receptors. Through appropriate lenses or reflectors, receptors can be made to be most sensitive to radiation emitted from a particular direction. In this manner a single broad beam transmitter can be used coupled with an array of focused receivers to obtain a rough image of the occupant.

Each of these methods of transmission or reception could be used, for example, at any of the preferred mounting locations shown in FIG. 1.

Another preferred location of a transmitter/receiver for use with airbags is shown at 111 in FIG. 1. In this case, the device is attached to or incorporated into the steering wheel and gives an accurate determination of the distance of the driver's chest from the airbag module. This implementation would generally be used with another device such as transmitter/receiver 110 at another location.

Alternate mountings for the transmitter/receiver include various locations on the instrument panel on either side of the steering column such as 113 in FIG. 1. Also, although some of the devices herein illustrated assume that for the ultrasonic system the same device would be used for both transmitting and receiving waves, there are advantages in separating these functions. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously providing the transmitted signal is modulated in such a manner that the received signal can be compared with the transmitted signal to determine the time it took for the waves to reach and reflect off of the occupant. Many methods exist for this modulation including varying the frequency or amplitude of the waves or by pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant, may be several milliseconds, information as to the position of the occupant is received continuously which permits an accurate, although delayed. determination of the occupant's velocity from successive position measurements. Conventional ultrasonic distance measuring devices must wait for the signal to travel to the occupant and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant located one foot from the transmitter can only be obtained every 2 milliseconds which corresponds to a frequency of 500 cycles per second.

This slow frequency that data can be collected seriously degrades the accuracy of the velocity calculation. The reflection of ultrasonic waves from the clothes of an occupant, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. An alternate method is to make use of the Doppler effect where the frequency of the reflected waves differs from the transmitted waves by an amount which is proportional to the occupant's velocity. In a preferred embodiment of the present invention, a single ultrasonic transmitter and a separate receiver are used to measure the position of the occupant, by the travel time of a known signal, and the velocity, by the frequency shift of that signal. Although the Doppler effect has been used to determine whether an occupant has fallen asleep as disclosed in the U.S. patent to King referenced above, it was not used in conjunction with a position measuring device in 1992 (when the earliest filed related application was filed) to determine whether an occupant is likely to become out of position and thus in danger of being injured by a deploying airbag. This combination is particularly advantageous since both measurements can be accurately and efficiently determined using a single transmitter and receiver pair resulting in a low cost system.

One problem with Doppler measurements is the slight change in frequency that occurs during normal occupant velocities. This requires that sophisticated electronic techniques be utilized to increase the frequency and thereby render it easier to measure the velocity using the phase shift. For many implementations, therefore, the velocity of the occupant is determined by calculating the difference between successive position measurements.

Another preferred embodiment of this invention makes use of radio waves and a voltage controlled oscillator (VCO). In this implementation, the frequency of the oscillator is controlled through the use of a phase detector which adjusts the oscillator frequency so that exactly one half wave occupies the distance from the transmitter to the receiver via reflection off of the occupant.

The adjusted frequency is thus inversely proportional to the distance from the transmitter to the occupant. Alternately, an FM phase discriminator can be used as known to those skilled in the art. These systems could be used in any of the locations illustrated in FIG. 1.

It was suggested in the U.S. patent to Mattes et al. discussed above, that a passive infrared system could be used to determine the position of an occupant relative to an airbag. Passive infrared measures the infrared radiation emitted by the occupant and compares it to the background. As such, unless it is coupled with a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position.

When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 1 as well as others not illustrated.

Passive infrared could also be used effectively in conjunction with a pattern recognition system. In this case, the passive infrared radiation emitted from an occupant can be focused onto a CCD array and analyzed with appropriate pattern recognition circuitry, or software, to determine the position of the occupant. Such a system could be mounted at any of the preferred mounting locations shown in FIG. 1 as well as others not illustrated.

Figure 2:
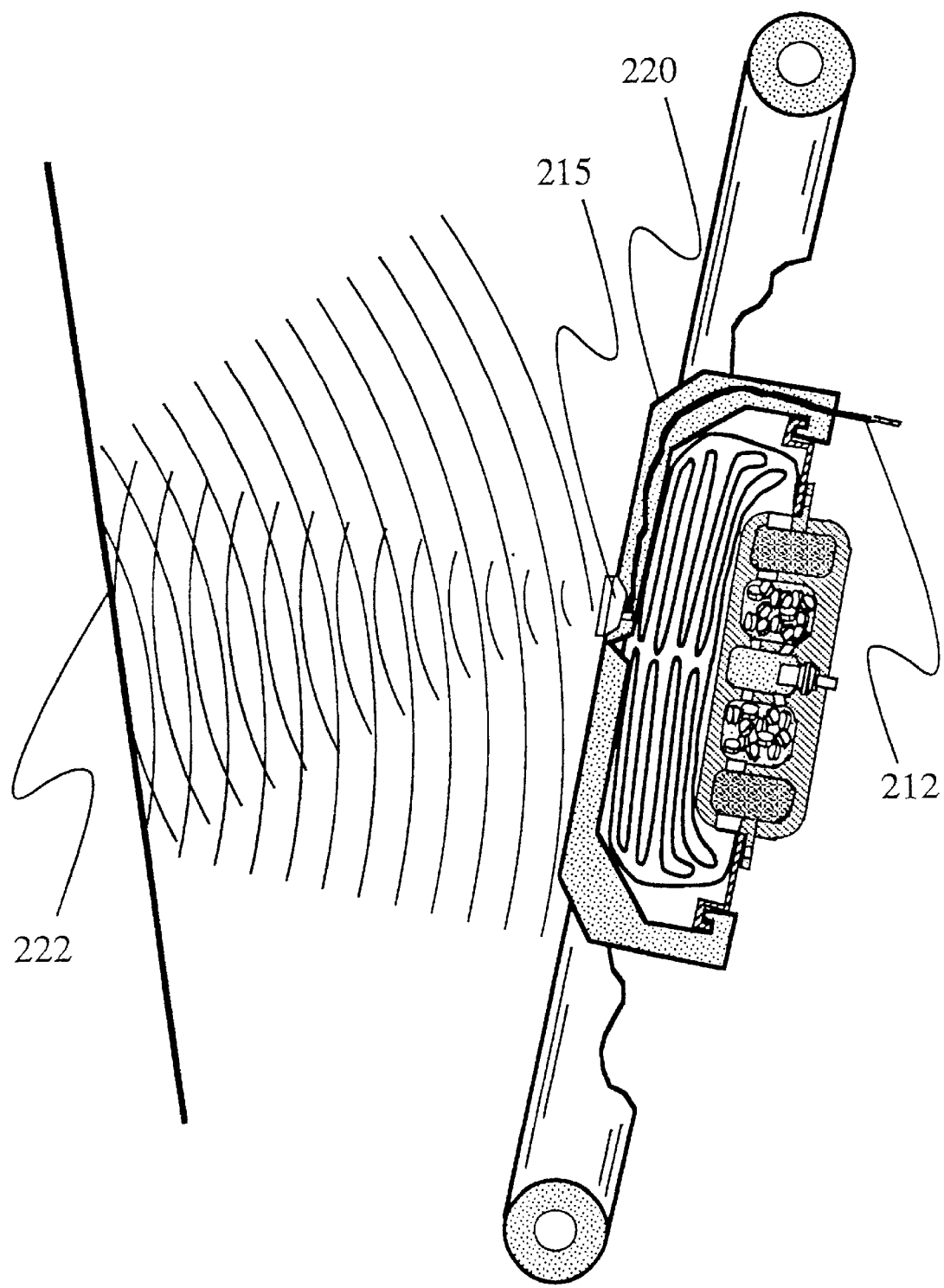
FIG. 2 is a cross section view of a steering wheel and airbag module assembly showing a preferred mounting location of an ultrasonic wave generator and receiver.

A distance measuring device 215 shown mounted on the cover 220 of the airbag module is shown in FIG. 2. The distance measuring device 215 is attached to various electronic circuitry, not shown, by means of wire cable 212 and functions to determine the distance between the device 215 and the occupant (the occupant's chest being represented by the line 222). When an airbag deploys, the cover 220 begins moving toward the driver. If the driver is in close proximity to this cover 220 during the early stages of deployment, the driver can be seriously injured or even killed. It is important, therefore, to sense the proximity of the driver to the cover 220 and if he or she gets too close, to disable deployment of the airbag. An accurate method of obtaining this information would be to place the distance measuring device 215 onto the airbag cover 220 as shown in FIG. 2. Appropriate electronic circuitry can be used to not only determine the actual distance of the driver from the cover 220 but also his velocity as discussed above. In this manner, a determination can be made as to where the driver is likely to be at the time of deployment of the airbag. This information can be used most importantly to prevent deployment but can also be used to modify any deployment parameter such as the rate of airbag deployment.

In FIG. 2, for one implementation of a distance measuring device, the device includes an ultrasonic transmitter and receiver (either a combined unit or separate units arranged proximate one another). By means of such an ultrasonic distance measuring unit, ultrasonic waves are transmitted toward the chest 222 of the driver. The reflected waves are then received by the distance measuring unit 215. The distance from the distance measuring unit 215 to the chest of the driver 22 can be computed from the time delay between the transmission and reception of the same wave.

The distance measuring device 215 can also be a capacitive proximity sensor or a capacitance sensor. One possible capacitance sensor called a capaciflector is described in U.S. Pat. No. 5,166,679, incorporated by reference herein. The capaciflector senses closeness or distance between the sensor and an object based on the capacitive coupling between the sensor and the object.

Figure 3:
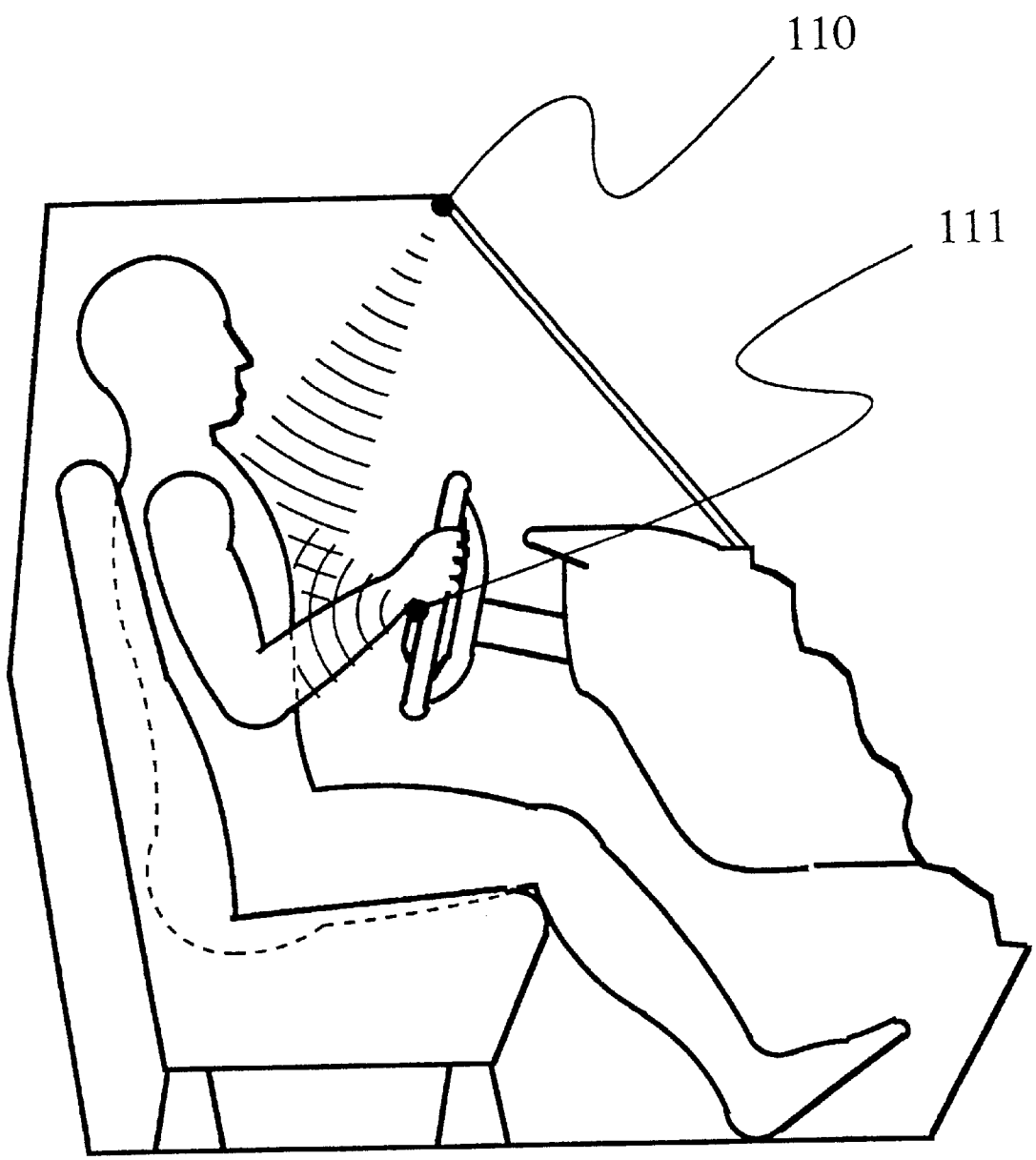
FIG. 3 is a side view, with certain portions removed or cut away, of a portion of the passenger compartment of a vehicle showing preferred mounting locations of the occupant position sensor employing multiple transmitters and receivers.

One problem of the system using a sensor 111 in FIG. 1 or sensor 215 as shown in FIG. 2 is that a driver may have inadvertently placed his hand over the transmitter/receiver 111 or 215, thus defeating the operation of the device. A second confirming transmitter/receiver 110 is therefore placed at some other convenient position such as on the roof or headliner of the passenger compartment as shown in FIG. 3. This transmitter/receiver operates in a manner similar to 111 and 215.

Figure 4:
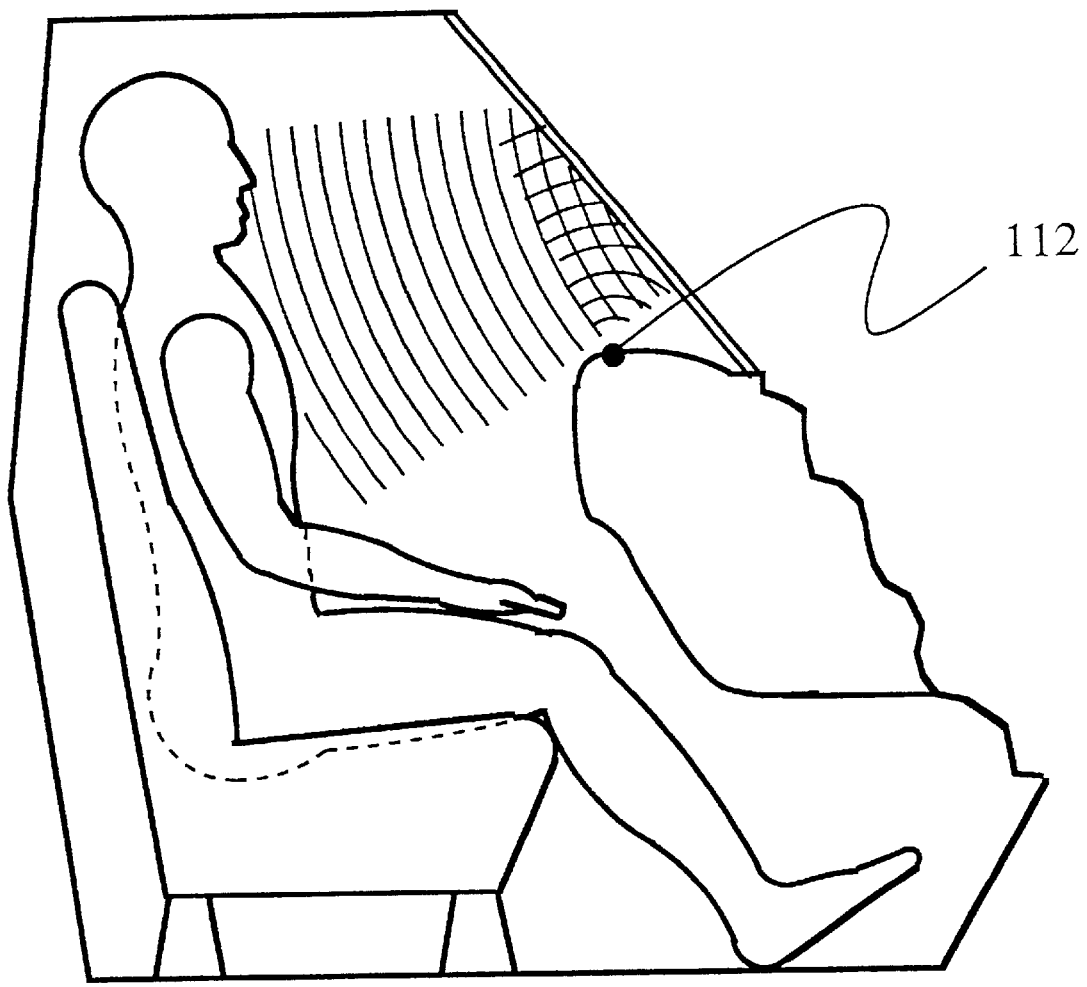
FIG. 4 is a side view, with certain portions removed or cut away, of a portion of the passenger compartment of a vehicle showing an occupant position sensor used in combination with a reflective windshield for sensing the position of the vehicle passenger.

A more complicated and sophisticated system is shown conceptually in FIG. 4 where transmitter/receiver assembly 112 is illustrated. In this case, as described briefly above, an infrared transmitter and a pair of optical receivers are used to capture the reflection of the passenger. When this system is used to monitor the driver as shown in FIG. 4, with appropriate circuitry and a microprocessor, the behavior of the driver can be monitored. Using this system, not only can the position, motion and velocity of the driver be determined and used in conjunction with an airbag system, but it is also possible to determine whether the driver is falling asleep or exhibiting other potentially dangerous behavior by comparing portions of his/her image over time. In this case, the speed of the vehicle can be reduced or the vehicle even stopped if this action is considered appropriate. This implementation has the highest probability of an unimpeded view of the driver since he/she must have a clear view through the windshield in order to operate the motor vehicle.

Figure 5:
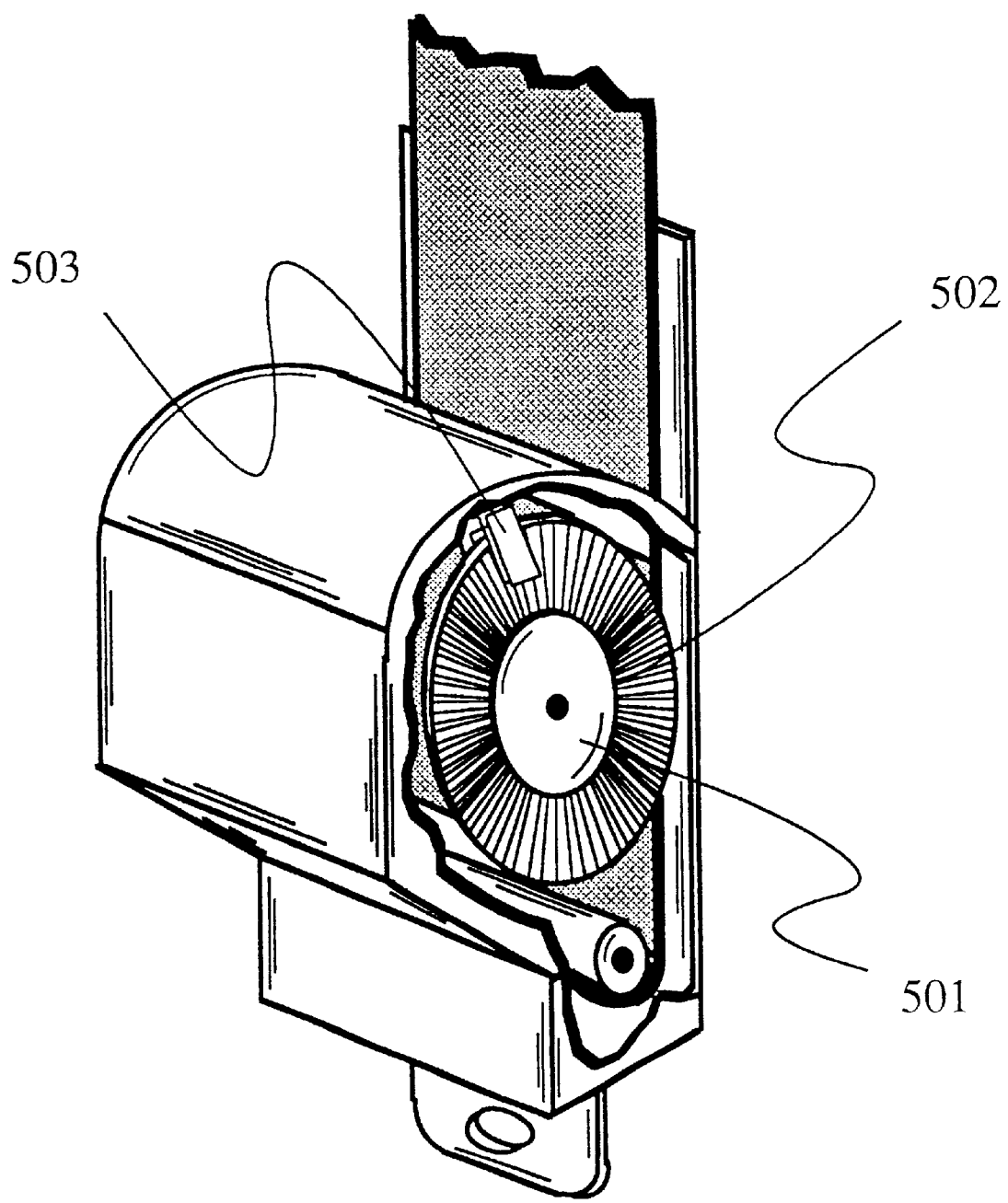
FIG. 5 is a partial cutaway view of a seatbelt retractor with a spool out sensor utilizing a shaft encoder.

As discussed above, a primary object of this invention is to provide information as to the location of the driver or other vehicle occupant, relative to the airbag, to appropriate circuitry which will process this information and make a decision as to whether to prevent deployment of the airbag in a situation where it would otherwise be deployed, or otherwise affect the time of deployment. One method of determining the position of the driver as discussed above is to actually measure his or her position either using microwaves, optics or acoustics. An alternate approach, which is preferably used to confirm the measurements made by the systems described above, is to use information about the position of the seat and the seatbelt spool out to determine the likely location of the driver relative to the airbag. To accomplish this the length of belt material which has been pulled out of the seatbelt retractor can be measured using conventional shaft encoder technology using either magnetic or optical systems. An example of an optical encoder is illustrated generally as 501 in FIG. 5. It consists of an encoder disk 502 and a receptor 503 which sends a signal to appropriate circuitry every time a line on the encoder disk passes by the receptor.

Figure 6:
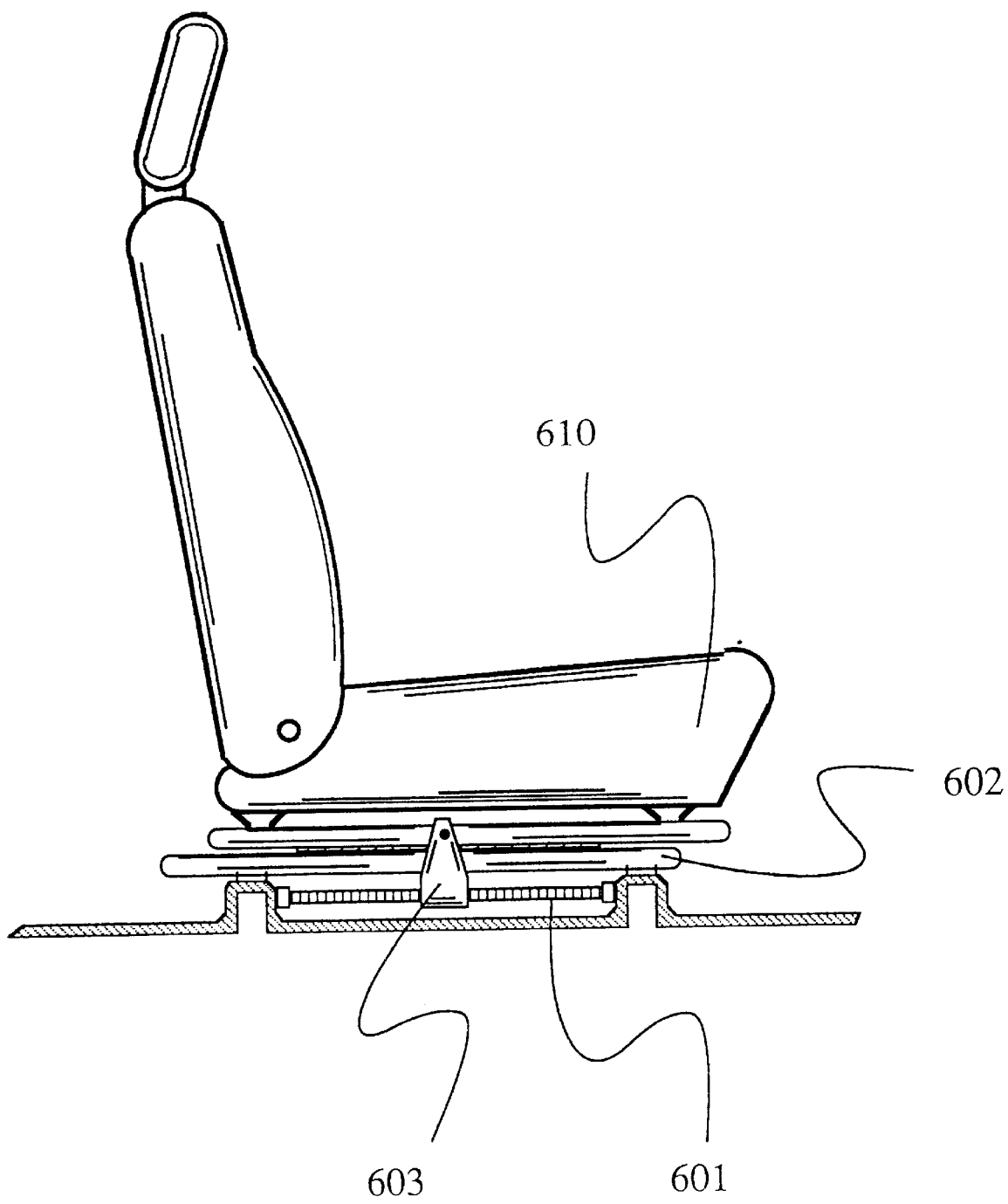
FIG. 6 is a side view of a portion of a seat and seat rail showing a seat position sensor utilizing a potentiometer.

In a similar manner, the position of the seat can be determined through either a linear encoder or a potentiometer as illustrated in FIG. 6. In this case, a potentiometer 601 is positioned along the seat track 602 and a sliding brush assembly 603 is used with appropriate circuitry to determine the fore and aft location of the seat 610. Naturally, for those seats which permit the seat back angle to be adjusted, a similar measuring system would be used to determine the angle of the seat back. In this manner the position of the seat relative to the airbag module can be determined. This information can be used in conjunction with the seatbelt spool out sensor to confirm the approximate position of the chest of the driver relative to the airbag.

For a simplified occupant position measuring system, a combination of seatbelt spool out sensor, seat belt buckle sensor, seat back position sensor, and seat position sensor (the "seat" in this last case meaning the seat portion) can be used either together or as a subset of such sensors to make an approximation as to the location of the driver or passenger in the vehicle. This information can be used to confirm the measurements of the ultrasonic and infrared sensors or as a stand-alone system. Naturally, as a stand-alone system it will not be as accurate as systems using ultrasonics or electromagnetics. Since a significant number of fatalities involve occupants who are not wearing seatbelts, and since accidents frequently involved significant pre-crash maneuvers and breaking that can cause at least the vehicle passenger to be thrown out of position, this system has serious failure modes. Nevertheless, sensors that measure seat position, for example, are available now and this system permits immediate introduction of a crude occupant position sensing system immediately and therefore it has great value. One such simple system, employs a seat position sensor only. For the driver, for example, if the seat is in the forwardmost position, then it makes no sense to deploy the driver airbag at full power. Instead, either a depowered deployment or no deployment would be called for in many crash situations.

For most cases, the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors would be used for the lap and shoulder portions of the seatbelt and the belt would not be permitted to slip through the "D-ring". The length of belt spooled out from the shoulder belt retractor then becomes a very good confirming measure of the position of the occupant's chest.

Figure 7:
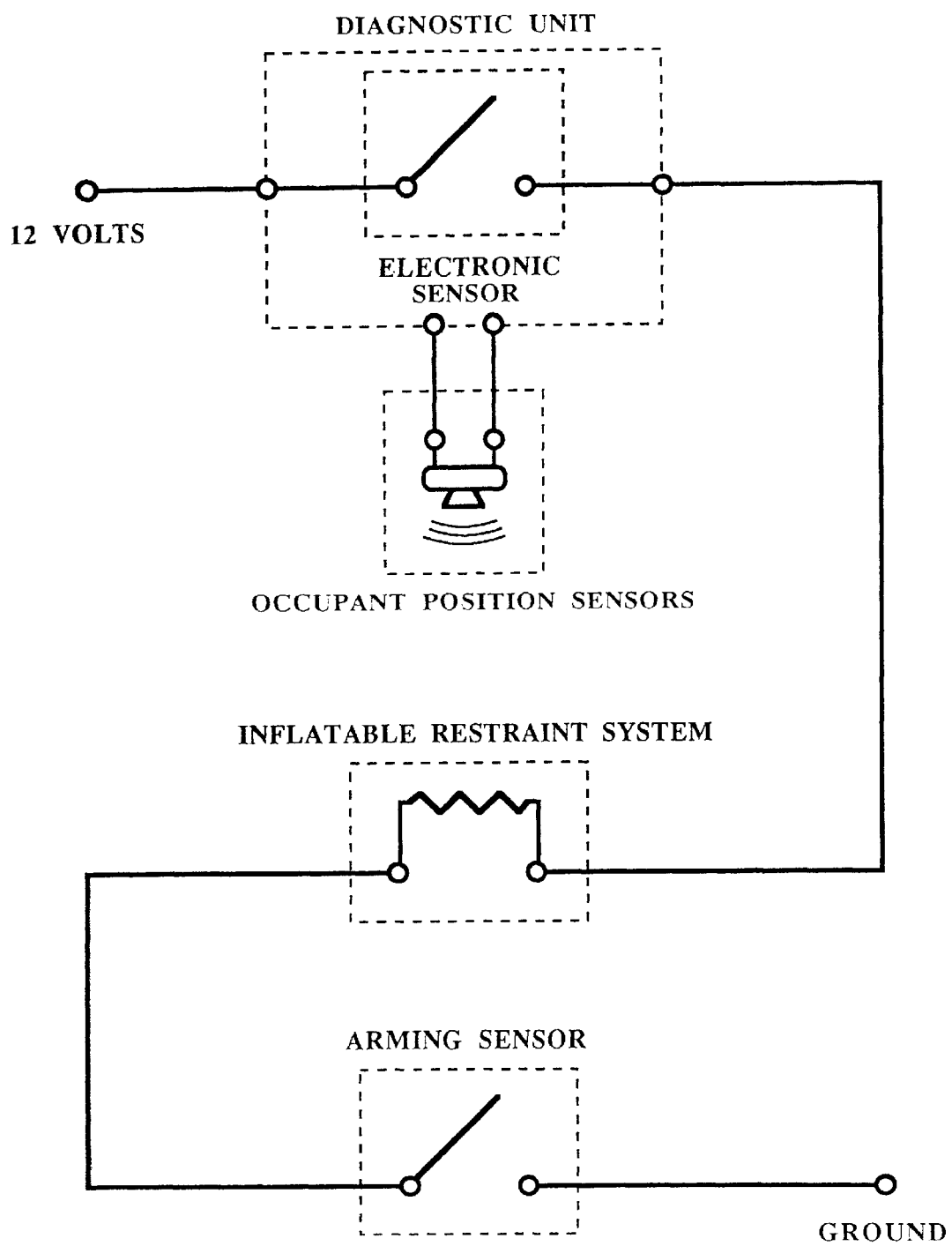
FIG. 7 is a circuit schematic illustrating the use of the occupant position sensor in conjunction with the remainder of the inflatable restraint system.

The occupant position sensor in any of its various forms can be integrated into the airbag system circuitry as shown schematically in FIG. 7. In this example, the occupant position sensors are used as an input to a smart electronic sensor and diagnostic system. The electronic sensor determines whether the airbag should be deployed based on the vehicle acceleration crash pulse, or crush zone mounted crash sensors, and the occupant position sensor determines whether the occupant is too close to the airbag and therefore that the deployment should not take place.

Figure 8:
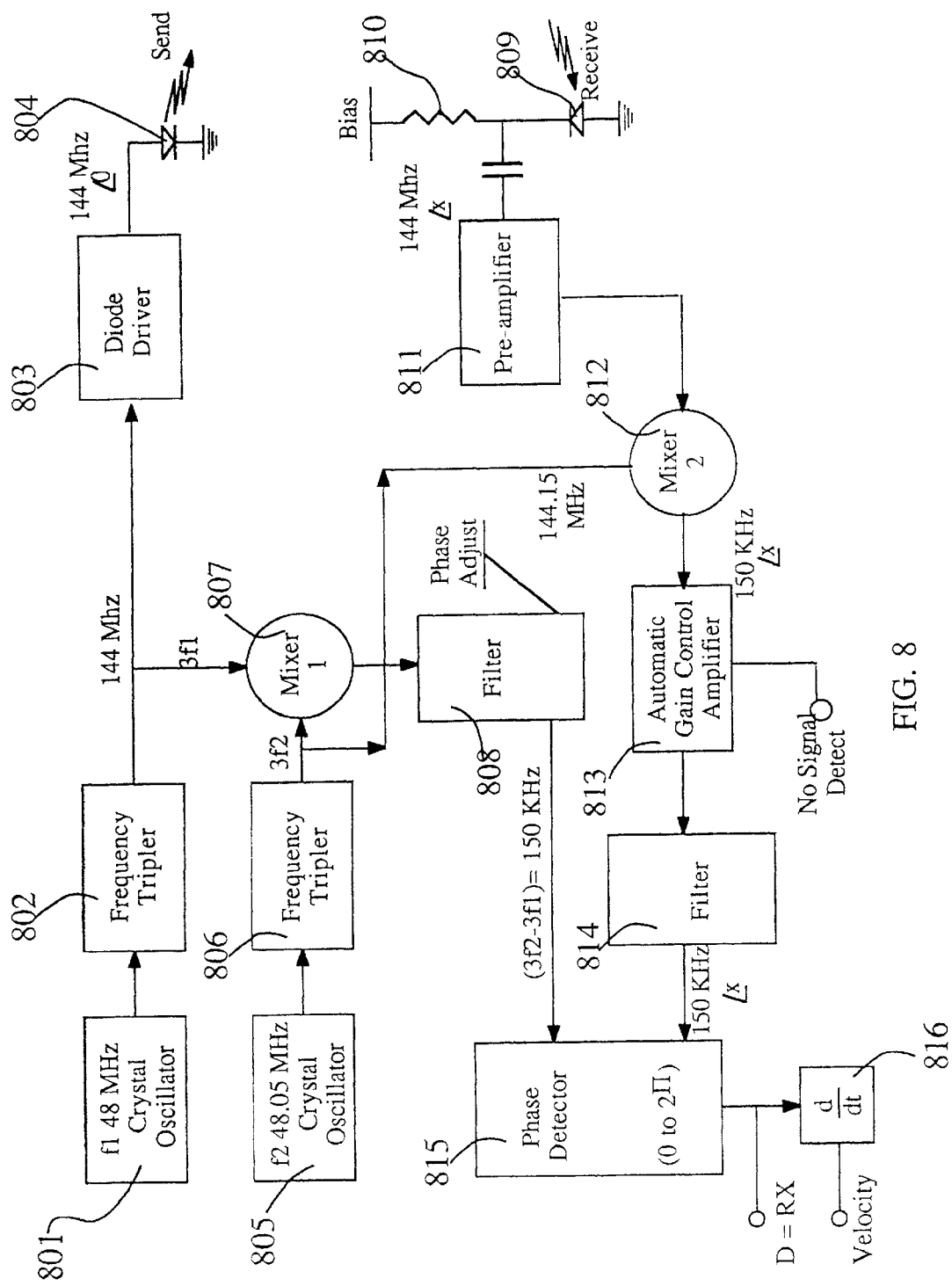
FIG. 8 is a schematic illustrating the circuit of an occupant position sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 8. The operation is as follows. A 48 MHz signal, f1, is generated by a crystal oscillator 801 and fed into a frequency tripler 802 which produces an output signal at 1.44 MHz. The 1.44 MHz signal is then fed into an infrared diode driver 803 which drives the infrared diode 804 causing it to emit infrared radiation modulated at 144 MHz and a reference phase angle of zero degrees. The infrared diode 804 is directed at the vehicle occupant. A second signal f2 having a frequency of 48.05 MHz, which is slightly greater than f1, is also fed into a frequency tripler 806 to create a frequency of 144.15 MHz. This signal is then fed into a mixer 807 which combines it with the 144 MHz signal from frequency tripler 802. The combined signal from the mixer 807 is then fed to filter 808 which removes all signals except for the difference, or beat frequency, between 3 times f1 and 3 times f2, of 150 kHz. The infrared signal which is reflected from the occupant is received by receiver 809 and fed into pre-amplifier 811. This signal has the same modulation frequency, 144 MHz, as the transmitted signal but now is out of phase with the transmitted signal by an angle x due to the path that the signal took from the transmitter to the occupant and back to the receiver. The output from pre-amplifier 811 is fed to a second mixer 812 along with the 144.15 MHz signal from the frequency tripler 806. The output from mixer 812 is then amplified by the automatic gain amplifier 813 and fed into filter 814. The filter 814 eliminates all frequencies except for the 150 kHz difference, or beat, frequency in a similar manner as was done by filter 808. The resulting 150 kHz frequency, however, now has a phase angle x relative to the signal from filter 808. Both 150 kHz signals are now fed into a phase detector 815 which determines the magnitude of the phase angle x. It can be shown mathematically that, with the above values, the distance from the transmitting diode to the occupant is x/345.6 where x is measured in degrees and the distance in meters.

The applications described herein have been illustrated using the driver of the vehicle. Naturally the same systems of determining the position of the occupant relative to the airbag apply to the passenger, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag.

Any of the occupant position sensors described herein, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries, for example, based on shape, size, position and/or motion. There has also been much written about the out of position child who is standing or otherwise positioned adjacent to the airbag, perhaps due to pre-crash braking. Naturally, the occupant position sensor described herein can prevent the deployment of the airbag in this situation.

Thus, among the other inventions disclosed above, is a simplified system for determining the approximate location of a vehicle occupant which may be used to control the deployment of the passive restraint. This occupant position determining system can be based on the position of the vehicle seat, the position of the seat back, the state of the seatbelt buckle switch, a seatbelt payout sensor or a combination of these. For example, in arrangements and method for determining the position of an occupant of a vehicle situated on a seat in accordance with the invention, the position of the seat and/or a part thereof is/are determined relative to a fixed point of reference to thereby enable a first approximation of the position of the occupant to be obtained, e.g., by a processor including a look-up table, algorithm or other means for correlating the position of the seat and/or part thereof to a likely position of the occupant. More particularly, the position of the seat portion of the seat and/or the back portion of the seat can be measured. If only the first approximation of the position of the occupant is obtained then this is considered the likely actual position of the occupant. However, to enhance the determination of the likely, actual position of the occupant, the length of the seatbelt pulled out of the seatbelt retractor can be measured by an appropriate sensor such that the position of the occupant is obtained in consideration of the position of the seat and the measured length of seatbelt pulled out of the seatbelt retractor. Also, a second approximation of the position of the occupant can be obtained, e.g., either by indirectly sensing the position of the occupant of the seat or by directly sensing the position of the occupant of the seat, such that the likely, actual position of the occupant is obtained in consideration of both approximations of the position of the occupant. By "directly" sensing the position of the occupant of the seat, it is meant that the position of the occupant itself is obtained by a detection of a property of the occupant without an intermediate measurement, e.g., a measurement of the position of the seat or the payout of the seatbelt, which must be correlated to the position of the occupant. Sensing the position of the occupant by taking an intermediate measurement would constitute an "indirect" sensing of the position of the occupant of the seat. The second approximation can be obtained by receiving waves from a space above the seat which are indicative of some aspect of the position of the occupant. e.g., the distance between the occupant and the receiver(s). If required, waves are transmitted into the space above the seat to be received by the receiver(s). Possible mounting locations for the transmitter and receiver(s) include proximate or attached to a rear view mirror of the vehicle, attached to the roof or headliner of the vehicle, on a steering wheel of the vehicle, on an instrument panel of the vehicle and on a cover of an airbag module.

Other inventions disclosed above are arrangements for controlling a deployable occupant restraint device in a vehicle to protect an occupant in a seat in the vehicle during a crash. Such arrangements include crash sensor means for determining whether deployment of the occupant restraint device is required as a result of the crash, an occupant position sensor arrangement for determining the position of the occupant, and processor means coupled to the crash sensor means and the occupant position sensor arrangement for controlling deployment of the occupant restraint device based on the determination by the crash sensor means if deployment of the occupant restraint device is required and the position of the occupant. The occupant position sensor arrangement includes seat position determining means for determining the position of the seat and/or a part thereof relative to a fixed point of reference to thereby enable a first approximation of the position of the occupant to be obtained. In the absence of additional approximations of the position of the occupant, the first approximation can be considered as the position of the occupant. The position of the seat and/or part thereof may be determined in any of the ways discussed above. The occupant position sensor arrangement may include measuring means coupled to the processor means for measuring the length of the seatbelt pulled out of the seatbelt retractor such that the processor means control deployment of the occupant restraint device based on the determination by the crash sensor means if deployment of the occupant restraint device is required, the position of the occupant and the measured length of seatbelt pulled out of the seatbelt retractor. The occupant position sensor arrangement can also include means for providing an additional approximation of the position of the occupant, either a direct sensing of the position of the occupant (a measurement of a property of the occupant) or an indirect sensing (a measurement of a property of a component in the vehicle which can be correlated to the position of the occupant), such that this approximation will be used in conjunction with the first approximation to provide a better estimate of the likely, actual position of the occupant. Such means may include receiver means for receiving waves from a space above the seat and optional transmitter means for transmitting waves into the space above the seat to be received by the receiver means. Possible mounting locations for the transmitter means and receiver means include proximate or attached to a rear view mirror of the vehicle, attached to the roof or headliner of the vehicle, on a steering wheel of the vehicle, on an instrument panel of the vehicle and on or proximate an occupant restraint device, e.g., on or proximate a cover of an airbag module. Other locations having a view of the space above seat are of course possible. An additional factor to consider in the deployment of the occupant restraint device is whether the seatbelt is buckled and thus in one embodiment, the occupant position sensor arrangement includes means coupled to the processor means for determining whether the seatbelt is buckled such that the processor means control deployment of the occupant restraint device based on the determination by the crash sensor means if deployment of the occupant restraint device is required, the position of the occupant and the determination of whether the seatbelt is buckled.

Another arrangement disclosed above for determining the position of an occupant of a vehicle situated on a seat in the vehicle comprises occupant position sensing means for obtaining a first approximation of the position of the occupant, and confirmatory position sensing means for obtaining a second approximation of the position of the occupant such that a likely actual position of the occupant is reliably determinable from the first and second approximations. The confirmatory position sensing means are arranged to measure the position of the seat and/or a part thereof relative to a fixed point of reference and the length of a seatbelt pulled out of a seatbelt retractor. For example, the confirmatory position sensing means can be one or more sensors arranged to measure the position of a seat portion of the seat, the position of a back portion of the seat and the length of the seatbelt pulled out of the seatbelt retractor.

Another arrangement disclosed above for controlling a deployable occupant restraint device in a vehicle to protect an occupant in a seat in the vehicle during a crash comprises crash sensor means for determining whether deployment of the occupant restraint device is required as a result of the crash, an occupant position sensor arrangement for determining the position of the occupant and processor means coupled to the crash sensor means and the occupant position sensor arrangement for controlling deployment of the occupant restraint device based on the determination by the crash sensor means if deployment of the occupant restraint device is required and the position of the occupant. The occupant position sensor arrangement includes occupant position sensing means for obtaining a first approximation of the position of the occupant, and confirmatory position sensing means for obtaining a second approximation of the position of the occupant such that the position of the occupant is reliably determinable from the first and second approximations. The confirmatory position sensing means are arranged to measure the position of the seat and/or a part thereof relative to a fixed point of reference and/or the length of a seatbelt pulled out of a seatbelt retractor. The occupant position sensor arrangement can also include means for determining whether the seatbelt is buckled in which case, the processor means control deployment of the occupant restraint device based on based on the determination by the crash sensor means if deployment of the occupant restraint device is required,the position of the occupant and the determination of whether the seatbelt is buckled.

Furthermore, also disclosed above is an apparatus for evaluating occupancy of a seat comprising emitter means for emitting electromagnetic radiation (e.g., visible light or infrared radiation (also referred to as infrared light herein)) into a space above the seat, detector means for detecting the emitted electromagnetic radiation returning from the direction of the seat, and processor means coupled to the detector means for determining the presence of an occupying item of the seat based on the electromagnetic radiation detected by the detector means, and if an occupying item is present, distinguishing between different occupying items to thereby obtain information about the occupancy of the seat. The processor means can also be arranged to determine the position of an occupying item if present and/or the position of only a part of an occupying item if present. In the latter case, if the occupying item is a human occupant, the part of the occupant whose position is determined by the processor means can be, e.g., the head of the occupant and the chest of the occupant. The detector means may comprise a plurality of detectors, e.g., receiver arrays such as CCD arrays or CMOS arrays, and the position of the part of the occupant determined by triangulation. In additional embodiments, the processor means can comprise pattern recognition means for applying an algorithm derived by conducting tests on the electromagnetic radiation detected by the detector means in the absence of an occupying item of the seat and in the presence of different occupying items. The emitter means may be arranged to emit a plurality of narrow beams of electromagnetic radiation, each in a different direction or include an emitter structured and arranged to scan through the space above the seat by emitting a single beam of electromagnetic radiation in one direction and changing the direction in which the beam of electromagnetic radiation is emitted. Either pulsed electromagnetic radiation or continuous electromagnetic radiation may be emitted. Further, if infrared radiation is emitted, the detector means are structured and arranged to detect infrared radiation. It is possible that the emitter means are arranged such that the infrared radiation emitted by the emitter means travels in a first direction toward a windshield of a vehicle in which the seat is situated, reflects off of the windshield and then travels in a second direction toward the space above the seat. The detector means may comprise an array of focused receivers such that an image of the occupying item if present is obtained. Possible locations of the emitter means and detector means include proximate or attached to a rear view mirror of a vehicle in which the seat is situated, attached to the roof or headliner of a vehicle in which the seat is situated, arranged on a steering wheel of a vehicle in which the seat is situated and arranged on an instrument panel of the vehicle in which the seat is situated. The apparatus may also comprise determining means for determining whether the occupying item is a human being whereby the processor means are coupled to the determining means and arranged to consider the determination by the determining means as to whether the occupying item is a human being. For example, the determining means may comprise a passive infrared sensor for receiving infrared radiation emanating from the space above the seat or a motion or life sensor (e.g. a heartbeat sensor).

A disclosed apparatus for controlling a deployable occupant restraint device in a vehicle to protect an occupant in a seat in the vehicle during a crash comprises emitter means for emitting electromagnetic radiation into a space above the seat, detector means for detecting the emitted electromagnetic radiation after it passes at least partially through the space above the seat, and processor means coupled to the detector means for determining the presence or absence of an occupying item of the seat based on the electromagnetic radiation detected by the detector means, if an occupying item is present, distinguishing between different occupying items to thereby obtain information about the occupancy of the seat, and affecting the deployment of the occupant restraint device based on the determined presence or absence of an occupying item and the information obtained about the occupancy of the seat. The processor means may also be arranged to determine the position of an occupying item if present and/or the distance between the occupying item if present and the occupant restraint device. In the latter case, deployment of the occupant restraint device is affected additionally based on the distance between the occupying item and the occupant restraint device. The processor means may also be arranged to determine the position of only a part of an occupying item if present, e.g., by triangulation. In additional embodiments, the processor means can comprise pattern recognition means for applying an algorithm derived by conducting tests on the electromagnetic radiation detected by the detector means in the absence of an occupying item of the seat and in the presence of different occupying items. The emitter means may be arranged to emit a plurality of narrow beams of electromagnetic radiation, each in a different direction or include an emitter structured and arranged to scan through the space above the seat by emitting a single beam of electromagnetic radiation in one direction and changing the direction in which the beam of electromagnetic radiation is emitted. Either pulsed electromagnetic radiation or continuous electromagnetic radiation may be emitted. Further, if infrared radiation is emitted, the detector means are structured and arranged to detect infrared radiation. It is possible that the emitter means are arranged such that the infrared radiation emitted by the emitter means travels in a first direction toward a windshield of a vehicle in which the seat is situated, reflects off of the windshield and then travels in a second direction toward the space above the seat. The detector means may comprise an array of focused receivers such that an image of the occupying item if present is obtained. Possible locations of the emitter means and detector means include proximate or attached to a rear view mirror of a vehicle in which the seat is situated, attached to the roof or headliner of a vehicle in which the seat is situated, arranged on a steering wheel of a vehicle in which the seat is situated and arranged on an instrument panel of the vehicle in which the seat is situated. The apparatus may also comprise determining means for determining whether the occupying item is a human being whereby the processor means are coupled to the determining means and arranged to consider the determination by the determining means as to whether the occupying item is a human being. For example, the determining means may comprise a passive infrared sensor for receiving infrared radiation emanating from the space above the seat or a motion or life sensor (e.g. a heartbeat sensor). The processor means affect deployment of the occupant restraint device by suppressing deployment of the occupant restraint device, controlling the time at which deployment of the occupant restraint device starts, or controlling the rate of deployment of the occupant restraint device. If the occupant restraint device is an airbag inflatable with a gas, the processor means may affect deployment of the occupant restraint device by suppressing deployment of the airbag, controlling the time at which deployment of the airbag starts, controlling the rate of gas flow into the airbag, controlling the rate of gas flow out of the airbag or controlling the rate of deployment of the airbag.

In another invention disclosed above, a vehicle occupant position system comprises sensor means for determining the position of the occupant in a passenger compartment of the vehicle, attachment means for attaching the sensor means to the motor vehicle; response means coupled to the sensor means for responding to the determined position of the occupant. The sensor means may comprise at least one transmitter for transmitting waves toward the occupant, at least one receiver for receiving waves which have been reflected off of the occupant and pattern recognition means for processing the waves received by the receiver(s). In some embodiments, when the vehicle includes a passive restraint system, the sensor means are arranged to determine the position of the occupant with respect to the passive restraint system, the system includes deployment means for deploying the passive restraint system and the response means comprise analysis means coupled to the sensor means and the deployment means for controlling the deployment means to deploy the passive restraint system based on the determined position of the occupant.

An embodiment of the vehicle occupant position and velocity sensor disclosed above comprises ultrasonic sensor means for determining the relative position and velocity of the occupant within the motor vehicle, attachment means for attaching the sensor means to the motor vehicle, and response means coupled to the sensor means for responding to the determined relative position and velocity of the occupant. The ultrasonic sensor means may comprise at least one ultrasonic transmitter which transmits ultrasonic waves into a passenger compartment of the vehicle, at least one ultrasonic receiver which receives ultrasonic waves transmitted from the ultrasonic transmitter(s) after they have been reflected off of the occupant, position determining means for determining the position of the occupant by measuring the time for the ultrasonic waves to travel from the transmitter (s) to the receiver(s), and velocity determining means for determining the velocity of the occupant, for example, by measuring the frequency difference between the transmitted and the received waves. Further, the ultrasonic sensor means may be structured and arranged to determine the position and velocity of the occupant at a frequency exceeding that determined by the formula: the velocity of sound divided by two times the distance from the sensor means to the occupant. In addition, the ultrasonic sensor means may comprise at least one transmitter for transmitting a group of ultrasonic waves toward the occupant, at least one receiver for receiving at least some of the group of transmitted ultrasonic waves after reflection off of the occupant, the at least some of the group of transmitted ultrasonic waves constituting a group of received ultrasonic waves, measurement means for measuring a time delay between the time that the group of waves were transmitted by the at least one transmitter and the time that the group of waves were received by the at least one receiver, determining means for determining the position of the occupant based on the time delay between transmission of the group of transmitted ultrasonic waves and reception of the group of received ultrasonic waves, and velocity detector means for determining the velocity of the occupant, e.g., a passive infrared detector.

Also disclosed above is an occupant head position sensor in accordance with the invention may comprise wave generator means arranged in the vehicle for directing waves toward a location in which a head of the occupant is situated, receiver means for receiving the waves reflected from the occupant's head, pattern recognition means coupled to the receiver means for receiving for determining the position of the occupant's head based on the waves reflected from the occupant's head and response means for responding to changes in the position of the occupant's head. The response means may comprise an alarm and/or limiting means for limiting the speed of the vehicle.

Also disclosed herein is an occupant position sensor system for a driver of a vehicle which comprises a sensor arranged on or incorporated into the steering wheel assembly of the vehicle and which provides an output signal which varies as a function of the distance between the sensor and the driver of the vehicle such that the position of the driver can be determined relative to a fixed point in the vehicle. The sensor may be arranged on or incorporated into the steering wheel assembly. If the steering wheel assembly includes an airbag module, the sensor can be arranged in connection with the airbag module possibly in connection with the cover of the airbag module. The sensor can be arranged to receive waves (e.g., ultrasonic, infrared or electromagnetic) from the passenger compartment indicative of the distance between the driver and the sensor. If the sensor is an ultrasonic-wave-receiving sensor, it could be built to include a transmitter to transmit waves into the passenger compartment whereby the distance between the driver and the sensor is determined from the time between transmission and reception of the same waves. Alternatively, the transmitter could be separate from the wave-receiving sensor or a capacitance sensor. The sensor could also be any existing capacitance sensor.

The position sensor may be used to affect the operation of any component in the vehicle which would have a variable operation depending on the position of the occupant. For example, the position sensor could be a part of an occupant restraint system including an airbag, crash sensor means for determining that a crash requiring deployment of the airbag is required, and control means coupled to the sensor and the crash sensor means for controlling deployment of the airbag based on the determination that a crash requiring deployment of the airbag is required and the distance between the driver and the sensor. Since the sensor is fixed in relation to the airbag, the distance between the airbag and the driver is determinable from the distance between the sensor and the driver. The control means can suppress deployment of the airbag if the distance between the airbag and the driver is within a threshold, i.e., less than a predetermined safe deployment distance. Also, the control means could modify one or more parameters of deployment of the airbag based on the distance between the sensor and the driver, i.e., the deployment force or time. Further, successive measurements of the distance between the sensor and the driver can be obtained and the velocity of the driver determined therefrom, in which case, the control means can control deployment of the airbag based on the velocity of the driver.

To avoid problems if the position sensor is blocked, the occupant position sensor system may further comprise a confirming sensor arranged to provide an output signal which varies as a function of the distance between the confirming sensor and the driver of the vehicle. The output signal from this confirming sensor is used to verify the position of the driver relative to the fixed point in the vehicle as determined by the sensor. The confirming sensor can be arranged on an interior side of a roof of the vehicle or on a headliner of the vehicle.

A steering wheel assembly for a vehicle is also disclosed and comprises a steering wheel, and a sensor arranged in connection therewith and arranged to provide an output signal which varies as a function of the distance between the sensor and the driver of the vehicle. The steering wheel assembly can include an airbag module, the sensor being arranged in connection therewith, e.g., on a cover thereof.

An airbag module for a vehicle is also disclosed and comprises a deployable airbag, a cover overlying the airbag and arranged to be removed or broken upon deployment of the airbag, and a sensor arranged on the cover and which provides an output signal which varies as a function of the distance between the sensor and an object. The sensor may be as described above, e.g., a wave-receiving sensor, including a transmitter. etc.

In a similar manner, an occupant restraint system for a vehicle is also disclosed and comprises an airbag module including a deployable airbag, a sensor arranged in connection with the module and which provides an output signal which varies as a function of the distance between the sensor and an object, crash sensor means for determining that a crash requiring deployment of the airbag is required, and control means coupled to the sensor and the crash sensor means for controlling deployment of the airbag based on the determination that a crash requiring deployment of the airbag is required and the distance between the object and the sensor. The control means may suppress deployment of the airbag or modify one or more parameters of deployment of the airbag based on the distance between the sensor and the object. A confirming sensor, as described above, may also be provided.

Another embodiment of an occupant restraint system comprises a steering wheel assembly including a deployable airbag, a sensor arranged in connection with or incorporated into the steering wheel assembly and which provides an output signal which varies as a function of the distance between the sensor and an object, crash sensor means for determining that a crash requiring deployment of the airbag is required, and control means coupled to the sensor and the crash sensor means for controlling deployment of the airbag based on the determination that a crash requiring deployment of the airbag is required and the distance between the object and the sensor. If the steering wheel assembly includes a cover overlying the airbag and arranged to be removed or broken upon deployment of the airbag, the sensor may be arranged on the cover.

A disclosed method for controlling deployment of an airbag comprises the steps of arranging the airbag in an airbag module, mounting the module in the vehicle, arranging a sensor in connection with the module, the sensor providing an output signal which varies as a function of the distance between the sensor and an object in the vehicle, determining whether a crash of the vehicle requiring deployment of the airbag is occurring or is about to occur, and controlling deployment of the airbag based on the determination of whether a crash of the vehicle requiring deployment of the airbag is occurring or is about to occur and the output signal from the sensor.

Also disclosed is a method for determining the position of an object in a vehicle including an airbag module which comprises the steps of arranging a wave-receiving sensor in connection with the airbag module, and generating an output signal from the sensor representative of the distance between the sensor and the object such that the position of the object is determinable from the distance between the sensor and the object.

There has thus been shown and described, inter alia, an occupant position sensor which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. A vehicle including an arrangement for identifying an occupying item, the arrangement comprising
   means for obtaining information or data about the occupying item, and
   a pattern recognition system for receiving the information or data about the occupying item and analyzing the information or data about the occupying item with respect to at least one characteristic selected from a group consisting of size, position, shape and motion to determine what the occupying item is whereby a distinction can be made as to whether the occupying item is human or an inanimate object.

2. The vehicle of claim 1, wherein the at least one characteristic is size.

3. The vehicle of claim 1, wherein the at least one characteristic is position.

4. The vehicle of claim 1, wherein the at least one characteristic is shape.

5. The vehicle of claim 1, wherein the at least one characteristic is motion.

6. The vehicle of claim 1, wherein said means for obtaining information or data comprise at least one receiver array which converts electromagnetic radiation into electrical signals such that the information or data about the occupying item is in the form of one or more electrical signals representative of an image of the occupying item.

7. The vehicle of claim 6, wherein said at least one receiver array comprises a pair of receiver arrays., said receiver arrays being mounted one on each side of a steering wheel of the vehicle.

8. The vehicle of claim 1, wherein said means for obtaining information or data comprise a single axis phase array antenna such that the information or data about the occupying item is in the form of an electrical signal representative of an image of the occupying item.

9. The vehicle of claim 8, further comprising a scanning radar beam.

10. The vehicle of claim 8, further comprising an array of light beams.

11. A vehicle including an arrangement for identifying an occupying item, the arrangement comprising
    means for obtaining information or data about the position of the occupying item, and
    a pattern recognition system for receiving the information or data about the positions of the occupying item and analyzing the information or data about the positions of the occupying item to determine what the occupying item is whereby a distinction can be made as to whether the occupying item is an occupant or an inanimate object based on its position.

12. The vehicle of claim 11, wherein said means for obtaining information or data comprise at least one receiver array which converts electromagnetic radiation into electrical signals such that the information or data about the occupying item is in the form of an electrical signal representative of an image of the occupying item.

13. A vehicle including an arrangement for controlling a vehicular component, the arrangement comprising:
    means for obtaining information or data about an occupying item of a seat,
    a pattern recognition system for receiving the information or data about the occupying item and analyzing the information or data about the occupying item with respect to at least one characteristic selected from a group consisting of size, position, shape, and motion, and
    control means for controlling the vehicular component based on the analysis of the information or data about the occupying item with respect to the at least one characteristic by said pattern recognition system.

14. The vehicle of claim 13, wherein said pattern recognition means are further arranged to analyze the information or data about the occupying item with respect to the at least one characteristic to determine what the occupying item is whereby a distinction can be made as to whether the occupying item is human or an inanimate object.

15. The vehicle of claim 13, wherein the at least one characteristic is size.

16. The vehicle of claim 13, wherein the at least one characteristic is position.

17. The vehicle of claim 13, wherein the at least one characteristic is shape.

18. The vehicle of claim 13, wherein the at least one characteristic is a motion.

19. The vehicle of claim 13, wherein said means for obtaining information or data comprise at least one receiver array which converts electromagnetic radiation into electrical signals such that the information or data about the occupying item is in the form of one or more electrical signals representative of an image of the occupying item.

20. The vehicle of claim 19, wherein said at least one receiver array comprises a pair of receiver arrays, said receiver arrays being mounted one on each side of a steering wheel of the vehicle.

21. The vehicle of claim 13, wherein said means for obtaining information or data comprise a single axis phase array antenna such that the information or data about the occupying item is in the form of an electrical signal representative of an image of the occupying item.

22. The vehicle of claim 21, further comprising a scanning radar beam.

23. The vehicle of claim 21, further comprising an array of light beams.

24. The vehicle of claim 13, wherein the vehicular component is an airbag.

25. The vehicle of claim 24, wherein said control means are arranged to enable suppression of deployment of the airbag.

26. A vehicle including an arrangement for controlling a vehicular component, the arrangement comprising:
    means for obtaining information or data about the position of an occupying item of a seat,
    a pattern recognition system for receiving the information or data about the position of the occupying item and analyzing the information or data about the position of the occupying item, and
    control means for controlling the vehicular component based on the analysis of the information or data about the position of the occupying item by said pattern recognition system.

27. The vehicle of claim 26, wherein said means for obtaining information or data comprise at least one receiver array which converts electromagnetic radiation into electrical signals such that the information or data about the occupying item is in the form of one or more electrical signals representative of an image of the occupying item.

28. A method for identifying an occupying item of a vehicle, comprising the steps of:
    obtaining information or data about the occupying item,
    providing the information or data about the occupying item to a pattern recognition system, and
    determining what the occupying item is by analyzing the information or data about the occupying item with respect to at least one characteristic selected from a group consisting of size, position, shape and motion in the pattern recognition system whereby the pattern recognition system differentiates a human occupant from inanimate objects.

29. The method of claim 28, wherein the at least one characteristic is size.

30. The method of claim 28, wherein the at least one characteristic is position.

31. The method of claim 28, wherein the at least one characteristic is shape.

32. The method of claim 28, wherein the at least one characteristic is motion.

33. The method of claim 28, wherein the step of obtaining information or data comprises the step of arranging at least one receiver array which converts electromagnetic radiation into electrical signals in the vehicle such that the information or data about the occupying item is in the form of one or more electrical signals representative of an image of the occupying item.

34. A method for identifying an occupying item of a vehicle, comprising the steps of:
    obtaining information or data about the position of the occupying item,
    providing the information or data about the position of the occupying item to a pattern recognition system, and
    determining what the occupying item is by analyzing the information or data about the position of the occupying item in the pattern recognition system whereby the pattern recognition system differentiates a human occupant from inanimate objects based on its position.

35. A method for controlling a vehicular component, comprising the steps of
    obtaining information or data about an occupying item of a seat of the vehicle,
    providing the information or data about the occupying item to a pattern recognition system,
    analyzing the information or data about the occupying item with respect to at least one characteristic selected from a group consisting of size, position, shape and motion in the pattern recognition system, and
    controlling the vehicular component based on the analysis of the information or data about the occupying item with respect to the at least one characteristic by the pattern recognition system.

36. The method of claim 35, wherein the at least one characteristic is size.

37. The method of claim 35, wherein the at least one characteristic is position.

38. The method of claim 35, wherein the at least one characteristic is shape.

39. The method of claim 35, wherein the at least one characteristic is motion.

40. The method of claim 35, wherein the vehicular component is an airbag.

41. The method of claim 40, wherein the step of controlling the airbag comprises the step of enabling suppression of deployment of the airbag.

42. A method for controlling a vehicular component, comprising the steps of:
    obtaining information or data about the position of an occupying item of a seat of the vehicle,
    providing the information or data about the position of the occupying item to a pattern recognition system,
    analyzing the information or data about the position of the occupying item in the pattern recognition system, and
    controlling the vehicular component based on the analysis of the information or data about the position of the occupying item by the pattern recognition system.

* * * * *

(12) INTER PARTES REEXAMINATION CERTIFICATE (578th)
United States Patent
Breed et al.

(10) Number: US 6,422,595 C1
(45) Certificate Issued: *Apr. 12, 2013

(54) OCCUPANT POSITION SENSOR AND METHOD AND ARRANGEMENT FOR CONTROLLING A VEHICULAR COMPONENT BASED ON AN OCCUPANT'S POSITION

(75) Inventors: David S. Breed, Boonton Township, Morris County, NJ (US); Wendell Johnson, San Diego, CA (US); Wilbur E. Duvall, Kimberling City, MO (US)

(73) Assignee: Automotive Technologies International, Inc., Denville, NJ (US)

Reexamination Request:
No. 95/001,002, Sep. 6, 2007

Reexamination Certificate for:
Patent No.: 6,422,595
Issued: Jul. 23, 2002
Appl. No.: 09/639,299
Filed: Aug. 15, 2000

(*) Notice: This patent is subject to a terminal disclaimer.

Related U.S. Application Data

(63) Continuation-in-part of application No. 08/905,877, filed on Aug. 4, 1997, now Pat. No. 6,186,537, which is a continuation of application No. 08/505,036, filed on Jul. 21, 1995, now Pat. No. 5,653,462, which is a continuation of application No. 08/040,978, filed on Mar. 31, 1993, now abandoned, which is a continuation-in-part of application No. 07/878,571, filed on May 5, 1992, now abandoned.

(51) Int. Cl.
*B60R 21/16* (2006.01)
*B60K 28/00* (2006.01)

(52) U.S. Cl.
USPC .................. 280/735; 180/272; 701/45

(58) Field of Classification Search .......... 280/735; 180/272; 701/45
See application file for complete search history.

(56) References Cited

To view the complete listing of prior art documents cited during the proceeding for Reexamination Control Number 95/001,002, please refer to the USPTO's public Patent Application Information Retrieval (PAIR) system under the Display References tab.

*Primary Examiner* — Matthew C. Graham

(57) ABSTRACT

Arrangement and method in a vehicle for identifying an occupying item in which information or data about the occupying item is obtained and a pattern recognition system analyzes this information or data with respect to size, position., shape and/or motion to determine what the occupying item is whereby a distinction can be made as to whether the occupying item is human or an inanimate object. The information or data may be obtained by one or more receiver arrays which converts electromagnetic radiation into electrical signals such that the information or data about the occupying item is in the form of one or more electrical signals representative of an image of the occupying item. The same information or data may be used in arrangements and methods for controlling a vehicular component which also include a pattern recognition system for receiving and analyzing the information or data and a control unit for controlling the vehicular component based on the analysis of the information or data about the occupying item with respect to the size, position, shape and/or motion by the pattern recognition system.

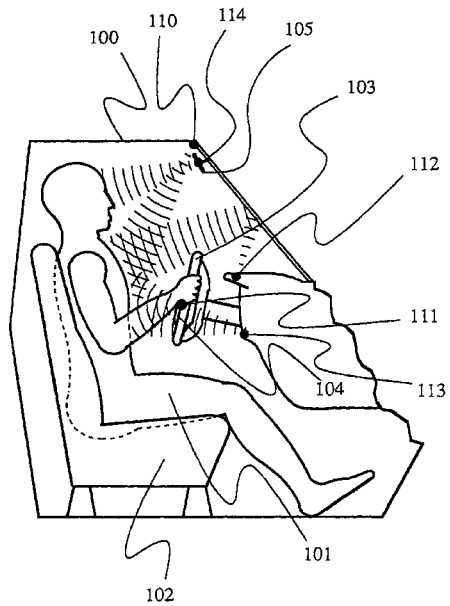

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-6, 11-19 and 24-42 are cancelled.

Claims 7-10 and 20-23 were not reexamined.

\* \* \* \* \*